(12) United States Patent
Shu et al.

(10) Patent No.: US 12,184,120 B2
(45) Date of Patent: Dec. 31, 2024

(54) STATOR MODULE AND MOTOR

(71) Applicant: BYD COMPANY LIMITED, Guangdong (CN)

(72) Inventors: Shenglang Shu, Shenzhen (CN); Bin You, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/409,503

(22) Filed: Jan. 10, 2024

(65) Prior Publication Data

US 2024/0195237 A1  Jun. 13, 2024

Related U.S. Application Data

(63) Continuation of application No. 17/059,184, filed as application No. PCT/CN2019/089318 on May 30, 2019, now Pat. No. 11,909,261.

(30) Foreign Application Priority Data

May 31, 2018 (CN) .......................... 201810552126.8

(51) Int. Cl.
*H02K 3/12* (2006.01)
*H02K 1/16* (2006.01)
*H02K 3/28* (2006.01)

(52) U.S. Cl.
CPC .............. *H02K 1/165* (2013.01); *H02K 3/12* (2013.01); *H02K 3/28* (2013.01); *H02K 2213/03* (2013.01)

(58) Field of Classification Search
CPC .................................. H02K 3/12; H02K 3/28
See application file for complete search history.

(56) References Cited

U.S. PATENT DOCUMENTS 6,140,735 A * 10/2000 Kato ....................... H02K 3/28
310/201
9,379,586 B2   6/2016 Rahman et al.
(Continued)

FOREIGN PATENT DOCUMENTS

CN          201008104 Y      1/2008
CN          100449909 C      1/2009
(Continued)

OTHER PUBLICATIONS

International Search Report and Written Opinion for Application No. PCT/CN2019/089318, mailed on Aug. 22, 2019, 11 pages.
(Continued)

*Primary Examiner* — Gary A Nash

(57) ABSTRACT

A stator module is applicable to a motor. The motor comprises z slots, 2p poles, and m phases, where z, p, and m are integers. The stator module includes a stator core and a stator winding. The stator core has multiple stator slots, and the stator slots are distributed in a circumferential direction of the stator core. The stator winding includes a first-class conductor segment, a second-class conductor segment, and a third-class conductor segment. A pitch between a first in-slot portion and a second in-slot portion of the first-class conductor segment is (y−1) stator slots, a pitch between a first in-slot portion and a second in-slot portion of the second-class conductor segment is y stator slots, and a pitch between a first in-slot portion and a second in-slot portion of the third-class conductor segment is (y+1) stator slots, where y is an integer and y=z/2p.

16 Claims, 15 Drawing Sheets

(56) References Cited

U.S. PATENT DOCUMENTS

| | | |
|---|---|---|
| 10,044,236 B2 | 8/2018 | Tamura |
| 2005/0206263 A1 | 9/2005 | Cai et al. |
| 2006/0152100 A1* | 7/2006 | Chen ........................ H02K 3/12 |
| | | 310/179 |
| 2013/0033145 A1 | 2/2013 | Randolph et al. |
| 2014/0319953 A1 | 10/2014 | Rahman et al. |
| 2015/0022047 A1* | 1/2015 | Shibata .................... H02K 3/28 |
| | | 310/208 |
| 2015/0162787 A1 | 6/2015 | Sakaue et al. |
| 2016/0268860 A1 | 9/2016 | Tsuiki et al. |

FOREIGN PATENT DOCUMENTS

| | | |
|---|---|---|
| CN | 102656775 A | 9/2012 |
| CN | 102668327 A | 9/2012 |
| CN | 104124803 A | 10/2014 |
| CN | 205489876 U | 8/2016 |
| CN | 106208435 A | 12/2016 |
| CN | 106410995 A | 2/2017 |
| CN | 207265747 U | 4/2018 |

OTHER PUBLICATIONS

Extended European Search Report and Opinion for EP Application No. 19810302.0, mailed on Jun. 17, 2021, 22 pages.

* cited by examiner

STATOR MODULE AND MOTOR

CROSS-REFERENCE TO RELATED APPLICATIONS

This application is a continuation of U.S. application Ser. No. 17/059,184, filed on Nov. 25, 2020, which is a National Stage of International Patent Application No. PCT/CN2019/089318, filed on May 30, 2019, which is based on and claims priority to and benefit of Chinese Patent Application No. 201810552126.8, filed on May 31, 2018. The entire content of all the above-referenced applications is incorporated herein by reference.

FIELD

This application relates to the field of motor technologies, and in particular, to a stator module and a motor having the stator module.

BACKGROUND

In the related art, a stator module of a motor is made in a wave-winding mode. Specifically, a wire is wave-wound from an outermost layer to an innermost layer, and then reversely wave-wound to the outermost layer. As analyzed from the manufacturing process and batch production, many types of flat wire armatures need to be manufactured, and both ends in an axial direction need to be welded, which results in many welding spots. In addition, in the wave-winding mode, it is difficult to accurately fasten a flat wire after paying-off, the production cost is high, and the manufacturing process is difficult. As analyzed from electrical connection, in the wave-winding mode, there is a high voltage difference between different layers in a same slot. Therefore, when the motor runs at a high voltage, breakdown easily occurs between layers, leading to a short circuit problem and a failure of the motor.

SUMMARY

This application aims to resolve one of technical problems in the related art at least to a certain extent. Therefore, this application provides a stator module, which can prevent a loop current phenomenon and a failure of a motor.

This application further provides a motor.

According to the stator module of this application, the stator module is applicable to a motor having z slots, 2p poles, and m phases, the number of slots per pole and phase is $q=z/m/(2p)$, the number of parallel branches is a, $a \leq q$, the stator module includes a stator core and a stator winding, the stator core has a plurality of stator slots, the plurality of stator slots are distributed in a circumferential direction of the stator core, in the circumferential direction of the stator core, the plurality of stator slots are a $1^{st}$ slot, a $2^{nd}$ slot, ..., an $i^{th}$ slot, ..., an $n^{th}$ slot, ..., and the like respectively, each of the plurality of stator slots has r slot layers, and the r slot layers are an $a^{th}$ layer, a $b^{th}$ layer, ..., a $j^{th}$ layer, ..., and an $r^{th}$ layer respectively in a direction from an inner side to an outer side in a radial direction of the stator core. A first winding coil of each phase of the stator winding includes a first winding part and a second winding part connected end to end, the first winding part constructs a start segment of the first winding coil, and the second winding part constructs an end segment of the first winding coil. In the first winding part, an $r^{th}$ layer of an $i^{th}$ slot is a start point of the first winding part, an $r^{th}$ layer of an $(i-24)^{th}$ slot is an end point of the first winding part, and the first winding part includes a first crossing segment to a sixth crossing segment, where the $r^{th}$ layer of the $i^{th}$ slot to an $r^{th}$ layer of an $(i-5)^{th}$ slot construct the first crossing segment; the $r^{th}$ layer of the $(i-5)^{th}$ slot to an $a^{th}$ layer of the $(i-5)^{th}$ slot construct the second crossing segment, and in the second crossing segment, the winding moves back and forth between the $(i-5)^{th}$ slot and an $(i-47)^{th}$ slot and is wound from the outer side of the radial direction to the inner side of the radial direction of the stator core; the $a^{th}$ layer of the $(i-5)^{th}$ slot to an $r^{th}$ layer of an $(i-11)^{th}$ slot construct the third crossing segment, and in the third crossing segment, the winding moves back and forth between the $(i-5)^{th}$ slot and the $(i-11)^{th}$ slot and is wound from the inner side of the radial direction to the outer side of the radial direction of the stator core; the $r^{th}$ layer of the $(i-11)^{th}$ slot to an $r^{th}$ layer of an $(i-18)^{th}$ slot construct the fourth crossing segment; the $r^{th}$ layer of the $(i-18)^{th}$ slot to an $a^{th}$ layer of the $(i-18)^{th}$ slot construct the fifth crossing segment, and in the fifth crossing segment, the winding moves back and forth between the $(i-18)^{th}$ slot and an $(i-12)^{th}$ slot and is wound from the outer side of the radial direction to the inner side of the radial direction of the stator core; and the $a^{th}$ layer of the $(i-18)^{th}$ slot to the $r^{th}$ layer of the $(i-24)^{th}$ slot construct the sixth crossing segment, and in the sixth crossing segment, the winding moves back and forth between the $(i-18)^{th}$ slot and the $(i-24)^{th}$ slot and is wound from the inner side of the radial direction to the outer side of the radial direction of the stator core. In the second winding part, the $r^{th}$ layer of the $(i-24)^{th}$ slot is a start point of the second winding part, a secondary outer layer of an $(i-42)^{th}$ slot is an end point of the second winding part, and the second winding part includes a seventh crossing segment to a twelfth crossing segment, where the $r^{th}$ layer of the $(i-24)^{th}$ slot to an $r^{th}$ layer of an $(i-29)^{th}$ slot construct the seventh crossing segment; the $r^{th}$ layer of the $(i-29)^{th}$ slot to an $a^{th}$ layer of the $(i-29)^{th}$ slot construct the eighth crossing segment, and in the eighth crossing segment, the winding moves back and forth between the $(i-29)^{th}$ slot and an $(i-23)^{th}$ slot and is wound from the outer side of the radial direction to the inner side of the radial direction of the stator core; the $a^{th}$ layer of the $(i-29)^{th}$ slot to an $r^{th}$ layer of an $(i-35)^{th}$ slot construct the ninth crossing segment, and in the ninth crossing segment, the winding moves back and forth between the $(i-29)^{th}$ slot and the $(i-35)^{th}$ slot and is wound from the inner side of the radial direction to the outer side of the radial direction of the stator core; the $r^{th}$ layer of the $(i-35)^{th}$ slot to an $r^{th}$ layer of the $(i-42)^{th}$ slot construct the tenth crossing segment; the $r^{th}$ layer of the $(i-42)^{th}$ slot to an $a^{th}$ layer of the $(i-42)^{th}$ slot construct the eleventh crossing segment, and in the eleventh crossing segment, the winding moves back and forth between the $(i-42)^{th}$ slot and an $(i-36)^{th}$ slot and is wound from the outer side of the radial direction to the inner side of the radial direction of the stator core; and the $a^{th}$ layer of the $(i-42)^{th}$ slot to the secondary outer layer of the $(i-42)^{th}$ slot construct the twelfth crossing segment, and in the twelfth crossing segment, the winding moves back and forth between the $(i-42)^{th}$ slot and the $i^{th}$ slot and is wound from the inner side of the radial direction to the outer side of the radial direction of the stator core. The $i^{th}$ slot is a start slot, and an outermost layer of the start slot is connected to a first lead line; and for an end slot, five stator slots exist between the end slot and the start slot, and a secondary outer layer of the end slot is connected to a first star point line. A second winding coil of each phase of the stator winding includes a third winding part and a fourth winding part connected end to end, the third winding part constructs a start segment of the second winding coil, and the fourth winding part constructs an end segment of the second winding coil. In the third winding part, an $r^{th}$ layer of an $(n-47)^{th}$ slot is a start point of the third winding part, an $r^{th}$ layer of an $(n-23)^{th}$ slot is an end point of the third winding part, and the third winding part includes a thirteenth crossing segment to an eighteenth crossing segment, where the $r^{th}$ layer of the $(n-47)^{th}$ slot to an $r^{th}$ layer of an $(n-6)^{th}$ slot construct the thirteenth crossing segment; the $r^{th}$ layer of the $(n-6)^{th}$ slot to an $a^{th}$ layer of the $(n-6)^{th}$ slot construct the fourteenth crossing segment, and in the fourteenth crossing segment, the winding moves back and forth between the $(n-6)^{th}$ slot and an $n^{th}$ slot and is wound from the outer side of the radial direction to the inner side of the radial direction of the stator core; the $a^{th}$ layer of the $(n-6)^{th}$ slot to an $r^{th}$ layer of an $(n-12)^{th}$ slot construct the fifteenth crossing segment, and in the fifteenth crossing segment, the winding moves back and forth between the $(n-6)^{th}$ slot and the $(n-12)^{th}$ slot and is wound from the inner side of the radial direction to the outer side of the radial direction of the stator core; the $r^{th}$ layer of the $(n-12)^{th}$ slot to an $r^{th}$ layer of an $(n-17)^{th}$ slot construct the sixteenth crossing segment; the $r^{th}$ layer of the $(n-17)^{th}$ slot to an $a^{th}$ layer of the $(n-17)^{th}$ slot construct the seventeenth crossing segment, and in the seventeenth crossing segment, the winding moves back and forth between the $(n-17)^{th}$ slot and an $(n-11)^{th}$ slot and is wound from the outer side of the radial direction to the inner side of the radial direction of the stator core; and the $a^{th}$ layer of the $(n-17)^{th}$ slot to the $r^{th}$ layer of the $(n-23)^{th}$ slot construct the eighteenth crossing segment, and in the eighteenth crossing segment, the winding moves back and forth between the $(n-17)^{th}$ slot and the $(n-23)^{th}$ slot and is wound from the inner side of the radial direction to the outer side of the radial direction of the stator core. In the fourth winding part, the $r^{th}$ layer of the $(n-23)^{th}$ slot is a start point of the fourth winding part, a secondary outer layer of an $(n-41)^{th}$ slot is an end point of the fourth winding part, and the fourth winding part includes a nineteenth crossing segment to a twenty-fourth crossing segment, where the $r^{th}$ layer of the $(n-23)^{th}$ slot to an $r^{th}$ layer of an $(n-30)^{th}$ slot construct the nineteenth crossing segment; the $r^{th}$ layer of the $(n-30)^{th}$ slot to an $a^{th}$ layer of the $(n-30)^{th}$ slot construct the twentieth crossing segment, and in the twentieth crossing segment, the winding moves back and forth between the $(n-30)^{th}$ slot and an $(n-24)^{th}$ slot and is wound from the outer side of the radial direction to the inner side of the radial direction of the stator core; the $a^{th}$ layer of the $(n-30)^{th}$ slot to an rih layer of an $(n-36)^{th}$ slot construct the twenty-first crossing segment, and in the twenty-first crossing segment, the winding moves back and forth between the $(n-30)^{th}$ slot and the $(n-36)^{th}$ slot and is wound from the inner side of the radial direction to the outer side of the radial direction of the stator core; the $r^{th}$ layer of the $(n-36)^{th}$ slot to an $r^{th}$ layer of the $(n-41)^{th}$ slot construct the twenty-second crossing segment; the $r^{th}$ layer of the $(n-41)^{th}$ slot to an $a^{th}$ layer of the $(n-41)^{th}$ slot construct the twenty-third crossing segment, and in the twenty-third crossing segment, the winding moves back and forth between the $(n-41)^{th}$ slot and an $(n-35)^{th}$ slot and is wound from the outer side of the radial direction to the inner side of the radial direction of the stator core; and the $a^{th}$ layer of the $(n-41)^{th}$ slot to the secondary outer layer of the $(n-41)^{th}$ slot construct the twenty-fourth crossing segment, and in the twenty-fourth crossing segment, the winding moves back and forth between the $(n-41)^{th}$ slot and the $(n-47)^{th}$ slot and is wound from the inner side of the radial direction to the outer side of the radial direction of the stator core. The $n^{th}$ slot is a start slot, and an outermost layer of the start slot is connected to a second lead line; and for an end slot, five stator slots exist between the end slot and the start slot, and a secondary outer layer of the end slot is connected to a second star point line.

According to the stator module of this application, through the cooperation between the stator core and the stator winding, the first lead line and the first star point line may be both disposed at a welding end, so that a height of the welding end may be fully utilized. In addition, the loop current phenomenon may be prevented, so as to prevent the failure of the motor.

According to some embodiments of this application, n=i.

According to some embodiments of this application, the stator winding includes a plurality of conductor segments, each of the conductor segments includes a bent portion and a first in-slot portion and a second in-slot portion that are connected to the bent portion, and first in-slot portions and second in-slot portions that are of the plurality of conductor segments and that are located in adjacent layers are welded on the welding end.

According to some embodiments of this application, the conductor segments include a first-class conductor segment, a second-class conductor segment, and a third-class conductor segment, a pitch between a first in-slot portion and a second in-slot portion of the first-class conductor segment is (y−1) stator slots, a pitch between a first in-slot portion and a second in-slot portion of the second-class conductor segment is y stator slots, and a pitch between a first in-slot portion and a second in-slot portion of the third-class conductor segment is (y+I) stator slots, where y is an integer and y=z/2p.

According to some embodiments of this application, the first-class conductor segment is located at the first crossing segment, the seventh crossing segment, the sixteenth crossing segment, and the twenty-second crossing segment, the first in-slot portion of the first-class conductor segment is located at an outermost layer of a stator slot, and the second in-slot portion of the first-class conductor segment is located at an outermost layer of another stator slot.

According to some embodiments of this application, the second-class conductor segment is located at the second crossing segment, the third crossing segment, the fifth crossing segment, the sixth crossing segment, the eighth crossing segment, the ninth crossing segment, the eleventh crossing segment, the twelfth crossing segment, the fourteenth crossing segment, the fifteenth crossing segment, the seventeenth crossing segment, the eighteenth crossing segment, the twentieth crossing segment, the twenty-first crossing segment, the twenty-third crossing segment, and the twenty-fourth crossing segment; and the second-class conductor segment includes an intra-layer conductor segment and an inter-layer conductor segment, where a first in-slot portion of the intra-layer conductor segment is located at an outermost layer of a stator slot, and a second in-slot portion is located at an outermost layer of another stator slot, or a first in-slot portion of the intra-layer conductor segment is located at an innermost layer of a stator slot, and a second in-slot portion is located at an innermost layer of another stator slot; and a first in-slot portion of the inter-layer conductor segment is located at a middle slot layer of a stator slot, and a second in-slot portion is located at a middle slot layer of another stator slot, which are located at different layers.

According to some embodiments of this application, the third-class conductor segment is located at the fourth crossing segment, the tenth crossing segment, the thirteenth crossing segment, and the nineteenth crossing segment, the first in-slot portion of the third-class conductor segment is located at an outermost layer of a stator slot, and the second in-slot portion of the third-class conductor segment is located at an outermost layer of another stator slot.

The motor according to this application includes the stator module.

According to the stator module of this application, the stator module is applicable to a motor having z slots, 2p poles, and m phases, the number of slots per pole and phase is $q=z/m/(2p)$, the number of parallel branches is a, $a \leq q$, the stator module includes a stator core and a stator winding, the stator core has 48 stator slots, the plurality of stator slots are distributed in a circumferential direction of the stator core, in the circumferential direction of the stator core, the plurality of stator slots are a $1^{st}$ slot, a $2^{nd}$ slot, ..., and a $48^{th}$ slot respectively, each of the plurality of stator slots has six slot layers, and the six slot layers are an $a^{th}$ layer, a $b^{th}$ layer, ..., and an $f^{th}$ layer respectively in a direction from an inner side to an outer side in a radial direction of the stator core. A first winding coil of each phase of the stator winding includes a first winding part and a second winding part connected end to end, the first winding part constructs a start segment of the first winding coil, and the second winding part constructs an end segment of the first winding coil. In the first winding part, an $f^{th}$ layer of a $1^{st}$ slot is a start point of the first winding part, an $f^{th}$ layer of a $25^{th}$ slot is an end point of the first winding part, and the first winding part includes a first crossing segment to a sixth crossing segment, where the $f^{th}$ layer of the $1^{st}$ slot to an $f^{th}$ layer of a $44^{th}$ slot construct the first crossing segment; the $f^{th}$ layer of the $44^{th}$ slot to an $a^{th}$ layer of the $44^{th}$ slot construct the second crossing segment, and in the second crossing segment, the winding moves back and forth between the $44^{th}$ slot and a $2^{nd}$ slot and is wound from the outer side of the radial direction to the inner side of the radial direction of the stator core; the $a^{th}$ layer of the $44^{th}$ slot to an $f^{th}$ layer of a $38^{th}$ slot construct the third crossing segment, and in the third crossing segment, the winding moves back and forth between the $44^{th}$ slot to the $38^{th}$ slot and is wound from the inner side of the radial direction to the outer side of the radial direction of the stator core; the $f^{th}$ layer of the $38^{th}$ slot to an $f^{th}$ layer of a $31^{st}$ slot construct the fourth crossing segment; the $f^{th}$ layer of the $31^{st}$ slot to an $a^{th}$ layer of the $31^{st}$ slot construct the fifth crossing segment, and in the fifth crossing segment, the winding moves back and forth between the $31^{st}$ slot and a $37^{th}$ slot and is wound from the outer side of the radial direction to the inner side of the radial direction of the stator core; and the $a^{th}$ layer of the $31^{st}$ slot to the $f^{th}$ layer of the $25^{th}$ slot construct the sixth crossing segment, and in the sixth crossing segment, the winding moves back and forth between the $31^{st}$ slot and the $25^{th}$ slot and is wound from the inner side of the radial direction to the outer side of the radial direction of the stator core. In the second winding part, the $f^{th}$ layer of the $25^{th}$ slot is a start point of the second winding part, a secondary outer layer of a $7^{th}$ slot is an end point of the second winding part, and the second winding part includes a seventh crossing segment to a twelfth crossing segment, where the $f^{th}$ layer of the $25^{th}$ slot to an $f^{th}$ layer of a $20^{th}$ slot construct the seventh crossing segment; the $f^{th}$ layer of the $20^{th}$ slot to an $a^{th}$ layer of the $20^{th}$ slot construct the eighth crossing segment, and in the eighth crossing segment, the winding moves back and forth between the $20^{th}$ slot and a $26^{th}$ slot and is wound from the outer side of the radial direction to the inner side of the radial direction of the stator core; the $a^{th}$ layer of the $20^{th}$ slot to an $f^{th}$ layer of a $14^{th}$ slot construct the ninth crossing segment, and in the ninth crossing segment, the winding moves back and forth between the $20^{th}$ slot to the $14^{th}$ slot and is wound from the inner side of the radial direction to the outer side of the radial direction of the stator core; the $f^{th}$ layer of the $14^{th}$ slot to an $f^{th}$ layer of the $7^{th}$ slot construct the tenth crossing segment; the $f^{th}$ layer of the $7^{th}$ slot to an $a^{th}$ layer of the $7^{th}$ slot construct the eleventh crossing segment, and in the eleventh crossing segment, the winding moves back and forth between the $7^{th}$ slot and a $13^{th}$ slot and is wound from the outer side of the radial direction to the inner side of the radial direction of the stator core; and the $a^{th}$ layer of the $7^{th}$ slot to the secondary outer layer of the $7^{th}$ slot construct the twelfth crossing segment, and in the twelfth crossing segment, the winding moves back and forth between the $7^{th}$ slot and the $1^{st}$ slot and is wound from the inner side of the radial direction to the outer side of the radial direction of the stator core. The $1^{st}$ slot is a start slot, and an outermost layer of the start slot is connected to a first lead line; and for an end slot, five stator slots exist between the end slot and the start slot, and a secondary outer layer of the end slot is connected to a first star point line. A second winding coil of each phase of the stator winding includes a third winding part and a fourth winding part connected end to end, the third winding part constructs a start segment of the second winding coil, and the fourth winding part constructs an end segment of the second winding coil. In the third winding part, an $f^{th}$ layer of a $2^{nd}$ slot is a start point of the third winding part, an $f^{th}$ layer of a $26^{th}$ slot is an end point of the third winding part, and the third winding part includes a thirteenth crossing segment to an eighteenth crossing segment, where the $f^{th}$ layer of the $2^{nd}$ slot to an $f^{th}$ layer of a $43^{rd}$ slot construct the thirteenth crossing segment; the $f^{th}$ layer of the $43^{rd}$ slot to an $a^{th}$ layer of the $43^{rd}$ slot construct the fourteenth crossing segment, and in the fourteenth crossing segment, the winding moves back and forth between the $43^{rd}$ slot and the $1^{st}$ slot and is wound from the outer side of the radial direction to the inner side of the radial direction of the stator core; the $a^{th}$ layer of the $43^{rd}$ slot to an $f^{th}$ layer of a $37^{th}$ slot construct the fifteenth crossing segment, and in the fifteenth crossing segment, the winding moves back and forth between the $43^{rd}$ slot to the $37^{th}$ slot and is wound from the inner side of the radial direction to the outer side of the radial direction of the stator core; the $f^{th}$ layer of the $37^{th}$ slot to an flh layer of a $32^{nd}$ slot construct the sixteenth crossing segment; the $f^{th}$ layer of the $32^{nd}$ slot to an $a^{th}$ layer of the $32^{nd}$ slot construct the seventeenth crossing segment, and in the seventeenth crossing segment, the winding moves back and forth between the $32^{nd}$ slot and a $33^{rd}$ slot and is wound from the outer side of the radial direction to the inner side of the radial direction of the stator core; and the $a^{th}$ layer of the $32^{nd}$ slot to the $f^{th}$ layer of the $26^{th}$ slot construct the eighteenth crossing segment, and in the eighteenth crossing segment, the winding moves back and forth between the $32^{nd}$ slot and the $26^{th}$ slot and is wound from the inner side of the radial direction to the outer side of the radial direction of the stator core. In the fourth winding part, the $f^{th}$ layer of the $26^{th}$ slot is a start point of the fourth winding part, a secondary outer layer of an $8^{th}$ slot is an end point of the fourth winding part, and the fourth winding part includes a nineteenth crossing segment to a twenty-fourth crossing segment, where the $f^{th}$ layer of the $26^{th}$ slot to an flh layer of a $19^{th}$ slot construct the nineteenth crossing segment; the $f^{th}$ layer of the $19^{th}$ slot to an $a^{th}$ layer of the $19^{th}$ slot construct the twentieth crossing segment, and in the twentieth crossing segment, the winding moves back and forth between the $19^{th}$ slot and the $25^{th}$ slot and is wound from the outer side of the radial direction to the inner side of the radial direction of the stator core; the $a^{th}$ layer of the $19^{th}$ slot to an $f^{th}$ layer of the $13^{th}$ slot construct the twenty-first crossing segment, and in the twenty-first crossing segment, the winding moves back and forth between the 19$^{th}$ slot to the 13$^{th}$ slot and is wound from the inner side of the radial direction to the outer side of the radial direction of the stator core; the f$^{th}$ layer of the 13$^{th}$ slot to an f$^{th}$ layer of the 13$^{th}$ slot construct the twenty-second crossing segment; the f$^{th}$ layer of the 13$^{th}$ slot to an a$^{th}$ layer of the 13$^{th}$ slot construct the twenty-third crossing segment, and in the twenty-third crossing segment, the winding moves back and forth between the 19$^{th}$ slot and the 14$^{th}$ slot and is wound from the outer side of the radial direction to the inner side of the radial direction of the stator core; and the a$^{th}$ layer of the 3$^{th}$ slot to the secondary outer layer of the 8$^{th}$ slot construct the twenty-fourth crossing segment, and in the twenty-fourth crossing segment, the winding moves back and forth between the 3$^{th}$ slot and the 2$^{nd}$ slot and is wound from the inner side of the radial direction to the outer side of the radial direction of the stator core. The 1$^{st}$ slot is a start slot, and an outermost layer of the start slot is connected to a second lead line; and for an end slot, five stator slots exist between the end slot and the start slot, and a secondary outer layer of the end slot is connected to a second star point line.

DETAILED DESCRIPTION

Figure 1:
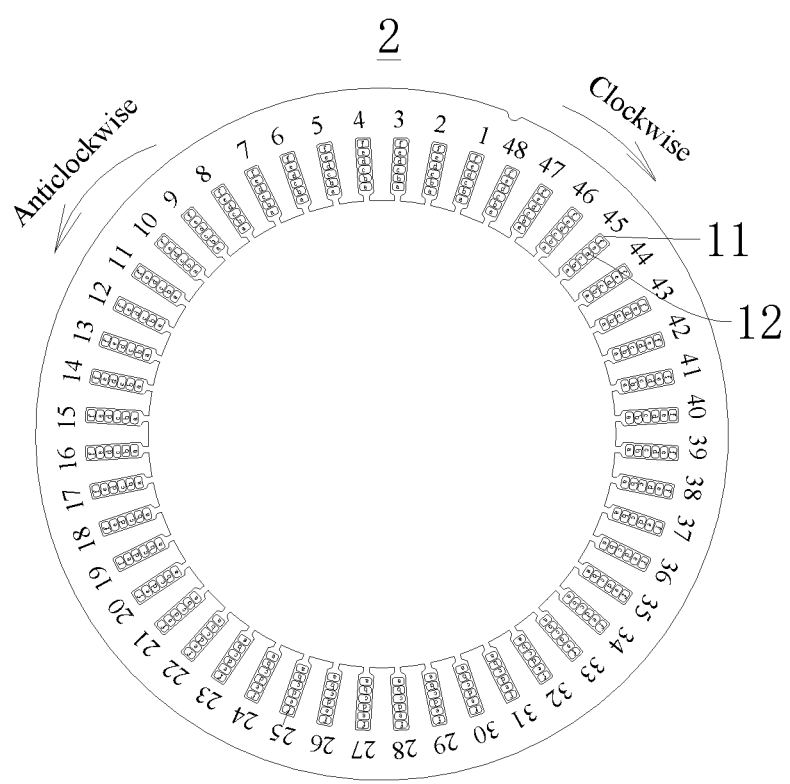
FIG. 1 is a top view of a stator winding according to an embodiment of this application.

The following describes embodiments of this application in detail. Examples of the embodiments are shown in the accompanying drawings. The following embodiments described with reference to the accompanying drawings are exemplary, and are intended to describe this application and cannot be construed as a limitation to this application.

In the description of this application, it should be understood that orientation or position relationships indicated by the terms such as "center", "longitudinal", "transverse", "length", "width", "thickness", "on", "below", "front", "back", "left", "right", "vertical", "horizontal", "top", "bottom", "inside", "outside", "clockwise", "anticlockwise", "axial direction", "radial direction", and "circumferential direction" are based on orientation or position relationships shown in the accompanying drawings, and are used only for ease and brevity of illustration and description, rather than indicating or implying that the mentioned apparatus or component must have a particular orientation or must be constructed and operated in a particular orientation. Therefore, such terms should not be construed as a limitation to this application. In addition, a feature defined with "first" or "second" may explicitly or implicitly include one or more features. In the description of this application, unless otherwise stated, "a plurality of" means two or more than two.

In the description of this application, it should be noted that unless otherwise explicitly specified or defined, the terms such as "mount", "install", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. Persons of ordinary skill in the art may understand the specific meanings of the terms in this application according to specific situations.

A stator module 10 according to the embodiments of this application is described below with reference to FIG. 1 to FIG. 17.

As shown in FIG. 1 to FIG. 17, according to the stator module 10 in the embodiments of this application, the stator module 10 is applicable to a motor having z slots, 2p poles, and m phases, the number of slots per pole and phase is q=z/m/(2p), the number of parallel branches is a, and a≤q, where z is the number of stator slots 11, m is the number of phases, and 2p is the number of poles. Herein, the number z of slots may be 24, 48, 72, or the like, and the number m of phases may be three phases, two phases, or a single phase. The stator module 10 may be applicable to a motor having 8 poles, 48 slots, and 3 phases. In other words, the number of stator slots 11 is z=48; the number of phases is m=3, where the three phases include a U phase, a V phase, and a W phase; and the number of poles is 2p=8 (that is, the number of pole pairs is 4), where the number p of pole pairs may be 8 poles, 4 poles, or the like, and may be set according to a specific applied motor.

Figure 2:
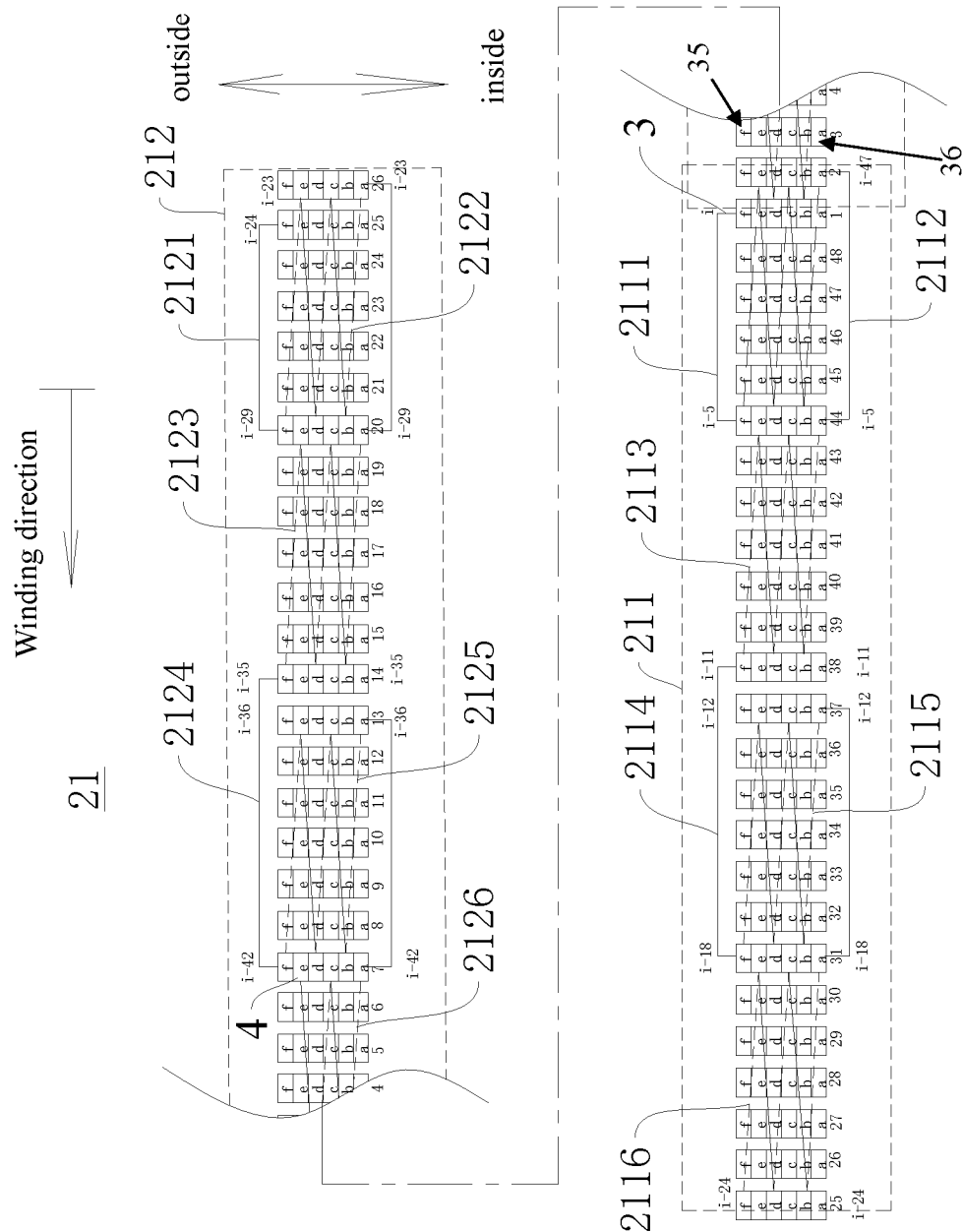
FIG. 2 is a schematic winding diagram of a first winding coil of the stator winding according to an embodiment of this application.
Figure 3:
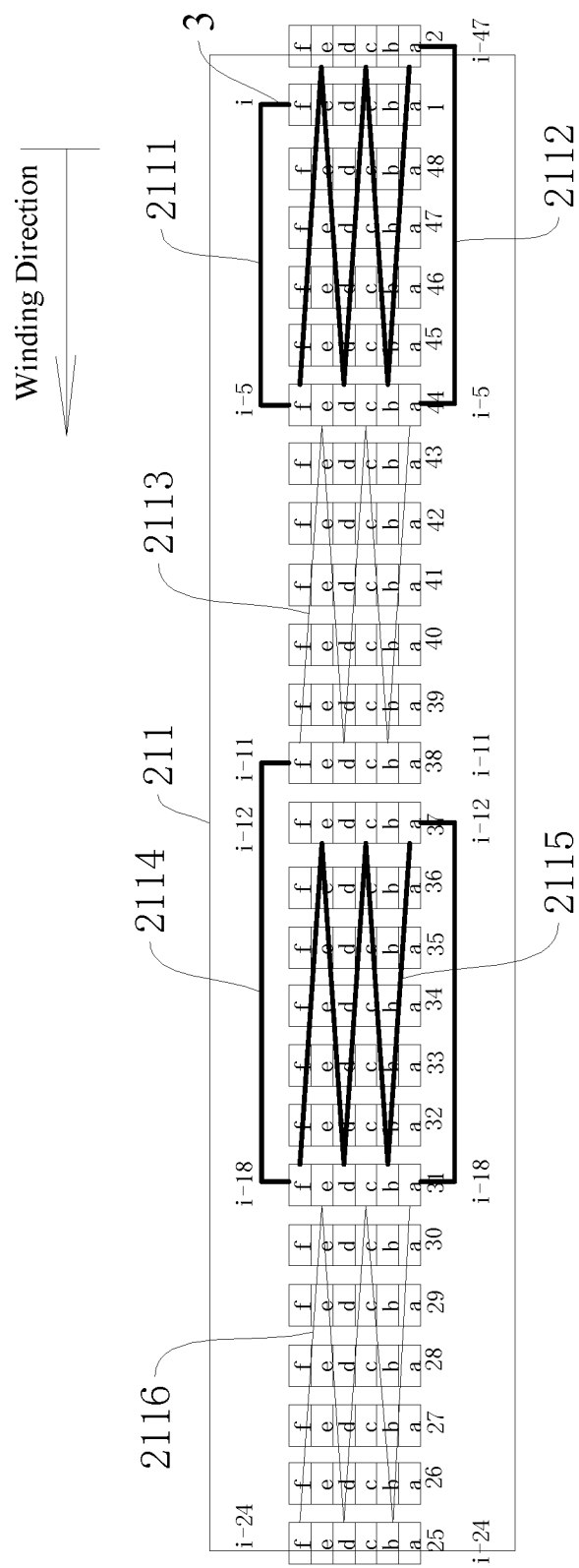
FIG. 3 is an enlarged view of a first winding part according to an embodiment of this application.
Figure 4:
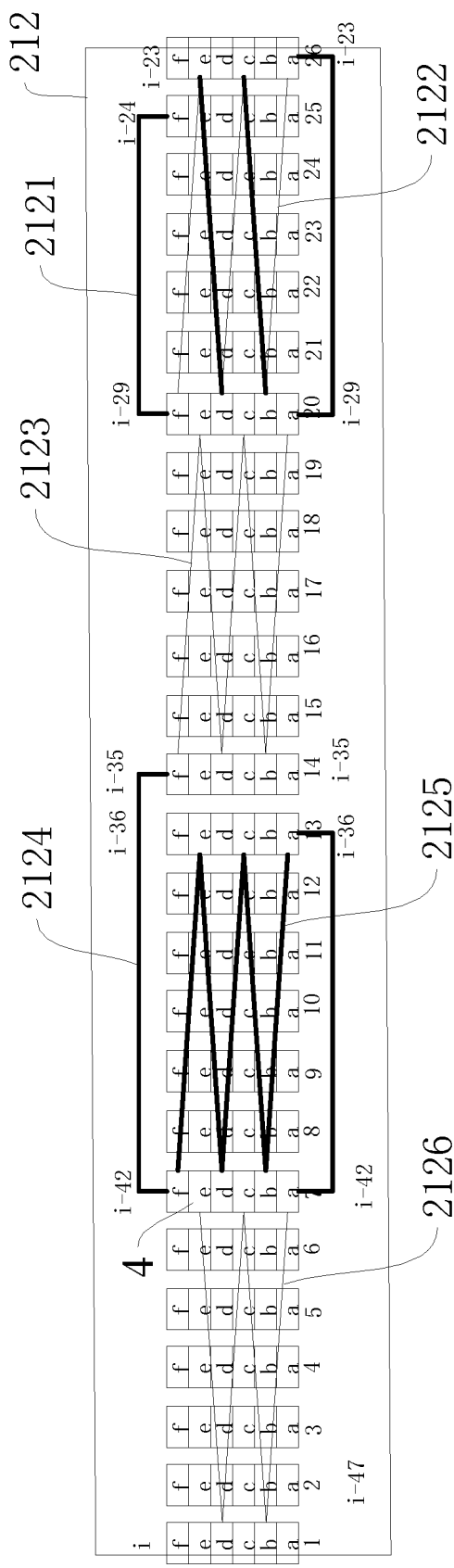
FIG. 4 is an enlarged view of a second winding part according to an embodiment of this application.

The stator module 10 may include: a stator core 1 and a stator winding 2. The stator core 1 has a plurality of stator slots 11, and the plurality of stator slots 11 are distributed in a circumferential direction of the stator core 1. In this application, using an anticlockwise direction of the circumferential direction as an example, in the anticlockwise direction of the circumferential direction of the stator core 1, the plurality of stator slots 11 are a 1$^{st}$ slot, a 2$^{nd}$ slot, . . . , an i$^{th}$ slot, . . . , an n$^{th}$ slot, . . . , and the like respectively, each of the stator slots 11 has r slot layers 12, and the r slot layers 12 are an a$^{th}$ layer, a b$^{th}$ layer, . . . , a j$^{th}$ layer, . . . , and an r$^{th}$ layer respectively in a direction from an inner side to an outer side in a radial direction of the stator core 1. It should be noted that the $r^{th}$ layer is an outermost slot layer 12. A top-bottom direction in FIG. 2 is a radial direction of the stator core 1, a lower part in FIG. 2 is an inner side of the radial direction of the stator core 1, and an upper part in FIG. 2 is an outer side of the radial direction of the stator core 1.

It should be noted that, in a process of counting the number of slots, when a slot needs to be determined, the $i^{th}$ slot may be used as a start point. When an "i-/+*"$^{th}$ slot needs to be counted, "*" slots are counted in a clockwise direction shown in FIG. 1 when "−" is located between i and *, and "*" slots are counted in an anticlockwise direction shown in FIG. 1 when "+" is located between i and *. For example, when an "i-42"$^{th}$ slot needs to be counted, as "−" is located between i and 42, "42" slots are counted in the clockwise direction shown in FIG. 1. In another example, when an "i+1"$^{th}$ slot needs to be counted, as "+" is located between i and 1, "1" slot is counted in the anticlockwise direction shown in FIG. 1.

A first winding coil 21 of each phase of the stator winding 2 may include a first winding part 211 and a second winding part 212 connected end to end, the first winding part 211 constructs a start segment of the first winding coil 21, and the second winding part 212 constructs an end segment of the first winding coil 21.

In the first winding part 211, a $r^{th}$ layer of an $i^{th}$ slot is a start point of the first winding part 211, and a $r^{th}$ layer of an $(i-24)^{th}$ slot is an end point of the first winding part 211. The first winding part 211 may include a first crossing segment 2111 to a sixth crossing segment 2116. It should be noted that, the first winding part 211 may include the first crossing segment 2111, the second crossing segment 2112, the third crossing segment 2113, the fourth crossing segment 2114, the fifth crossing segment 2115, and the sixth crossing segment 2116.

The $r^{th}$ layer of the $i^{th}$ slot to an $r^{th}$ layer of an $(i-5)^{th}$ slot construct the first crossing segment 2111; the $r^{th}$ layer of the $(i-5)^{th}$ slot to an $a^{th}$ layer of the $(i-5)^{th}$ slot construct the second crossing segment 2112, and in the second crossing segment 2112, the winding moves back and forth between the $(i-5)^{th}$ slot and an $(i-47)^{th}$ slot and is wound from the outer side of the radial direction to the inner side of the radial direction of the stator core 1; the $a^{th}$ layer of the $(i-5)^{th}$ slot to an $r^{th}$ layer of an $(i-11)^{th}$ slot construct the third crossing segment 2113, and in the third crossing segment 2113, the winding moves back and forth between the $(i-5)^{th}$ slot and the $(i-11)^{th}$ slot and is wound from the inner side of the radial direction to the outer side of the radial direction of the stator core 1; the $r^{th}$ layer of the $(i-11)^{th}$ slot to an $r^{th}$ layer of an $(i-18)^{th}$ slot construct the fourth crossing segment 2114; the $r^{th}$ layer of the $(i-18)^{th}$ slot to an $a^{th}$ layer of the $(i-18)^{th}$ slot construct the fifth crossing segment 2115, and in the fifth crossing segment 2115, the winding moves back and forth between the $(i-18)^{th}$ slot and an $(i-12)^{th}$ slot and is wound from the outer side of the radial direction to the inner side of the radial direction of the stator core 1; and the $a^{th}$ layer of the $(i-18)^{th}$ slot to the $r^{th}$ layer of the $(i-24)^{th}$ slot construct the sixth crossing segment 2116, and in the sixth crossing segment 2116, the winding moves back and forth between the $(i-18)^{th}$ slot and the $(i-24)^{th}$ slot and is wound from the inner side of the radial direction to the outer side of the radial direction of the stator core 1.

In the second winding part 212, the $r^{th}$ layer of the $(i-24)^{th}$ slot is a start point of the second winding part 212, and a secondary outer layer of an $(i-42)^{th}$ slot is an end point of the second winding part 212. The second winding part 212 may include a seventh crossing segment 2121 to a twelfth crossing segment 2126. It should be noted that, the second winding part 212 may include the seventh crossing segment 2121, the eighth crossing segment 2122, the ninth crossing segment 2123, the tenth crossing segment 2124, the eleventh crossing segment 2125, and the twelfth crossing segment 2126.

The $r^{th}$ layer of the $(i-24)^{th}$ slot to an $r^{th}$ layer of an $(i-29)^{th}$ slot construct the seventh crossing segment 2121; the $r^{th}$ layer of the $(i-29)^{th}$ slot to an $a^{th}$ layer of the $(i-29)^{th}$ slot construct the eighth crossing segment 2122, and in the eighth crossing segment 2122, the winding moves back and forth between the $(i-29)^{th}$ slot and an $(i-23)^{th}$ slot and is wound from the outer side of the radial direction to the inner side of the radial direction of the stator core 1; the $a^{th}$ layer of the $(i-29)^{th}$ slot to an $r^{th}$ layer of an $(i-35)^{th}$ slot construct the ninth crossing segment 2123, and in the ninth crossing segment 2123, the winding moves back and forth between the $(i-29)^{th}$ slot and the $(i-35)^{th}$ slot and is wound from the inner side of the radial direction to the outer side of the radial direction of the stator core 1; the $r^{th}$ layer of the $(i-35)^{th}$ slot to an $r^{th}$ layer of the $(i-42)^{th}$ slot construct the tenth crossing segment 2124; the $r^{th}$ layer of the $(i-42)^{th}$ slot to an $a^{th}$ layer of the $(i-42)^{th}$ slot construct the eleventh crossing segment 2125, and in the eleventh crossing segment 2125, the winding moves back and forth between the $(i-42)^{th}$ slot and an $(i-36)^{th}$ slot and is wound from the outer side of the radial direction to the inner side of the radial direction of the stator core 1; and the $a^{th}$ layer of the $(i-42)^{th}$ slot to the secondary outer layer of the $(i-42)^{th}$ slot construct the twelfth crossing segment 2126, and in the twelfth crossing segment 2126, the winding moves back and forth between the $(i-42)^{th}$ slot and the $i^{th}$ slot and is wound from the inner side of the radial direction to the outer side of the radial direction of the stator core 1.

The $i^{th}$ slot is a start slot, and an outermost layer of the start slot is connected to a first lead line 3; and for an end slot, five stator slots 11 exist between the end slot and the start slot, and a secondary outer layer of the end slot is connected to a first star point line 4. It should be noted that, as shown in FIG. 2, the $1^{st}$ slot may be the start slot, an $f^{th}$ layer of the start slot is connected to the first lead line 3, and the $44^{th}$ slot may be the end slot, and an eth layer of the end slot is connected to the first star point line 4.

According to a specific embodiment of this application, using a motor having 8 poles and 48 slots as an example, a specific wiring manner of a wiring scheme of a stator winding 2 having two coils and six turns is described in the following. For ease of description, it is specified that 1a indicates a first layer of a slot whose number is 1, and similarly, 48f indicates a $6^{th}$ layer of a slot whose number is 48.

FIG. 2 shows a winding manner of the first winding coil 21 of each phase of the stator winding 2. If has the first lead line 3, 7e has the first star point line 4, a winding star point of the first winding coil 21 of each phase of the stator winding 2 is If, and a specific winding mode of the first winding coil 21 of each phase of the stator winding 2 is as follows:

1f→44f→2e→44d→2c→44b→2a→44a→
38b→44c→38d→44e→38f→31f→37e→31d→
37c→31b→37a→31a→25b→31c→25d→31e→
25f→20f→26e→20d→26c→20b→26a→20a→
14b→20c→14d→20e→14f→7f→13e→7d→13c→
7b→13a→7a→1b→7c→1d→7e.

Through winding in this winding mode, a winding structure of the first winding coil 21 of each phase of the stator winding 2 may be optimized. Through this winding mode, the first lead line 3 and the first star point line 4 may be both disposed at a welding end 232, so that a height of the welding end 232 may be fully utilized.

It should be noted that, in a process of counting the number of slots, when a slot needs to be determined, the $n^{th}$ slot may be used as a start point. When an "n−/+*"$^{th}$ slot needs to be counted, "*" slots are counted in the clockwise direction shown in FIG. 1 when "−" is located between n and *, and "*" slots are counted in the anticlockwise direction shown in FIG. 1 when "+" is located between n and *. For example, when an "n−41"$^{th}$ slot needs to be counted, as "−" is located between n and 41, "41" slots are counted in the clockwise direction shown in FIG. 1. In another example, when an "n+1"$^{th}$ slot needs to be counted, as "+" is located between n and 1, "1" slot is counted in the anticlockwise direction shown in FIG. 1.

Figure 5:
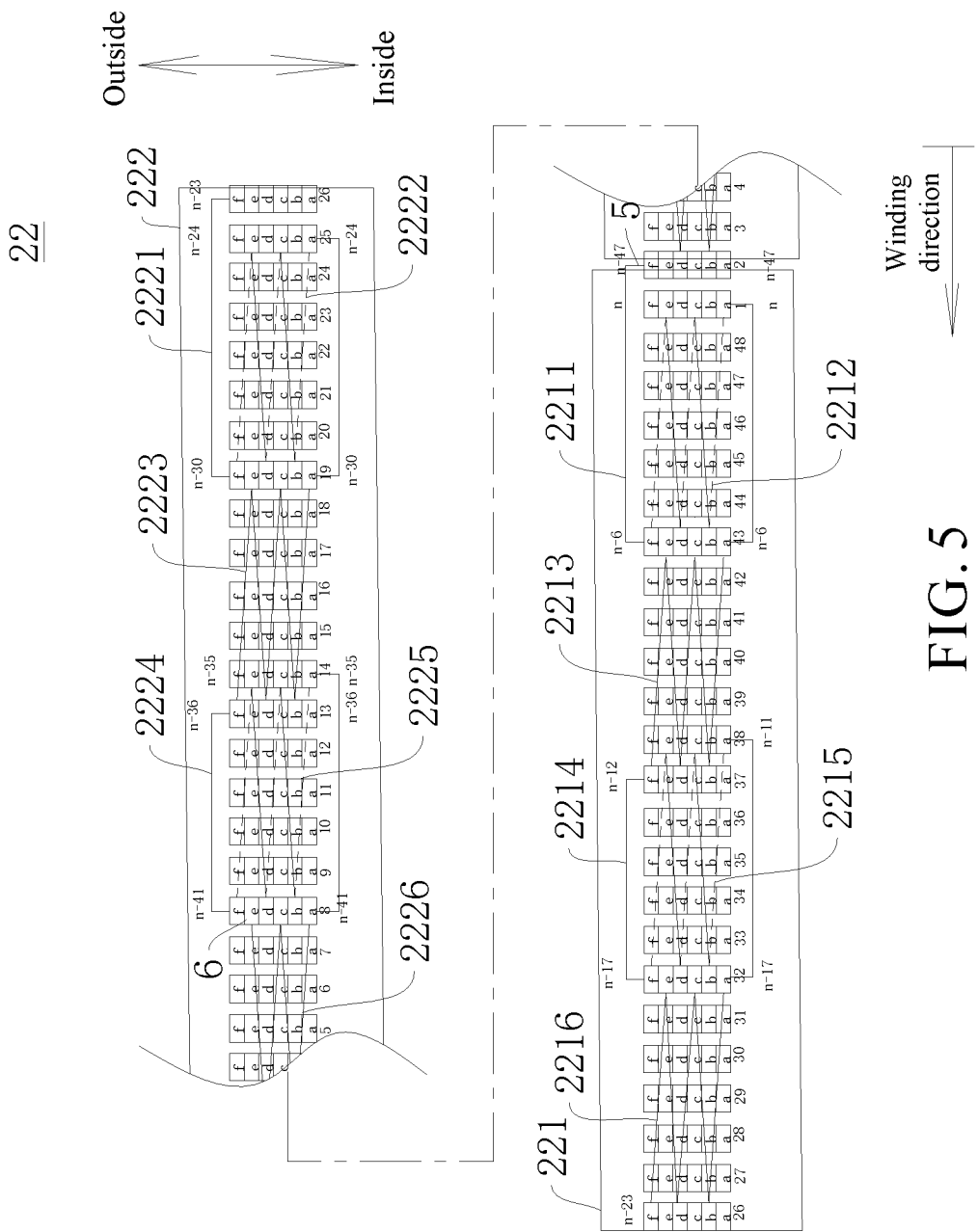
FIG. 5 is a schematic winding diagram of a second winding coil of the stator winding according to an embodiment of this application.
Figure 6:
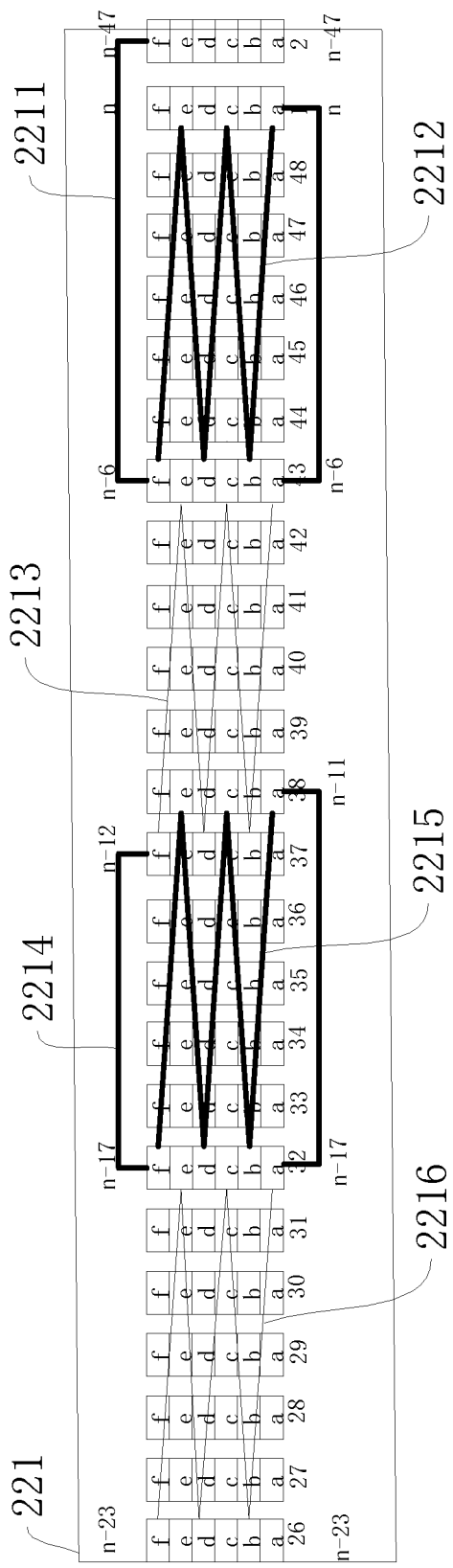
FIG. 6 is an enlarged view of a third winding part according to an embodiment of this application.
Figure 7:
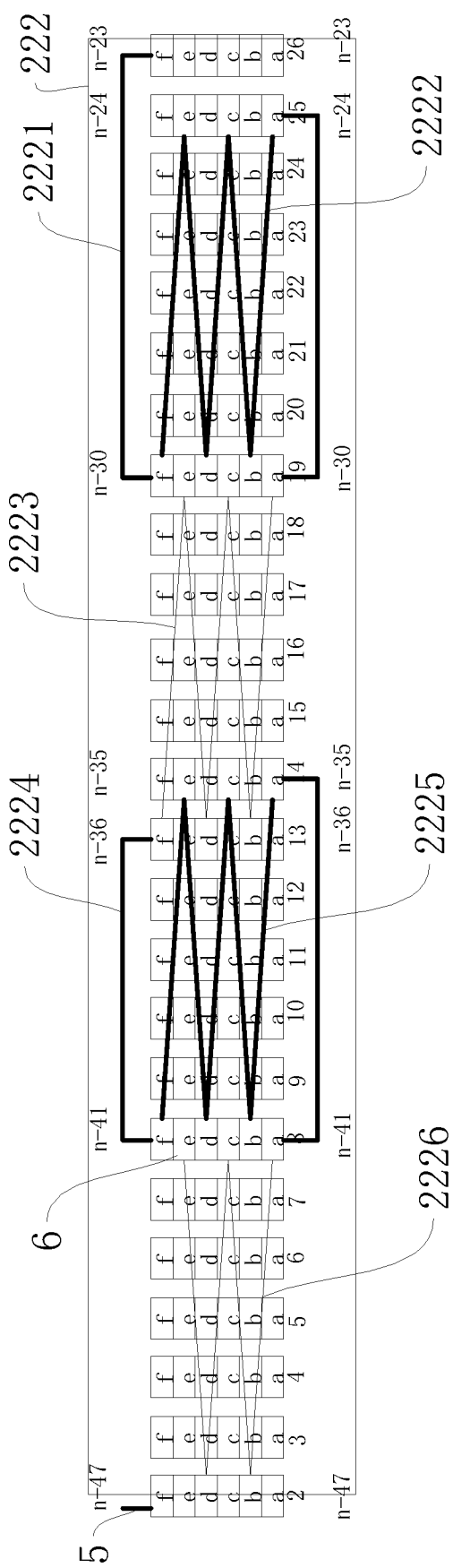
FIG. 7 is an enlarged view of a fourth winding part according to an embodiment of this application.
Figure 8:
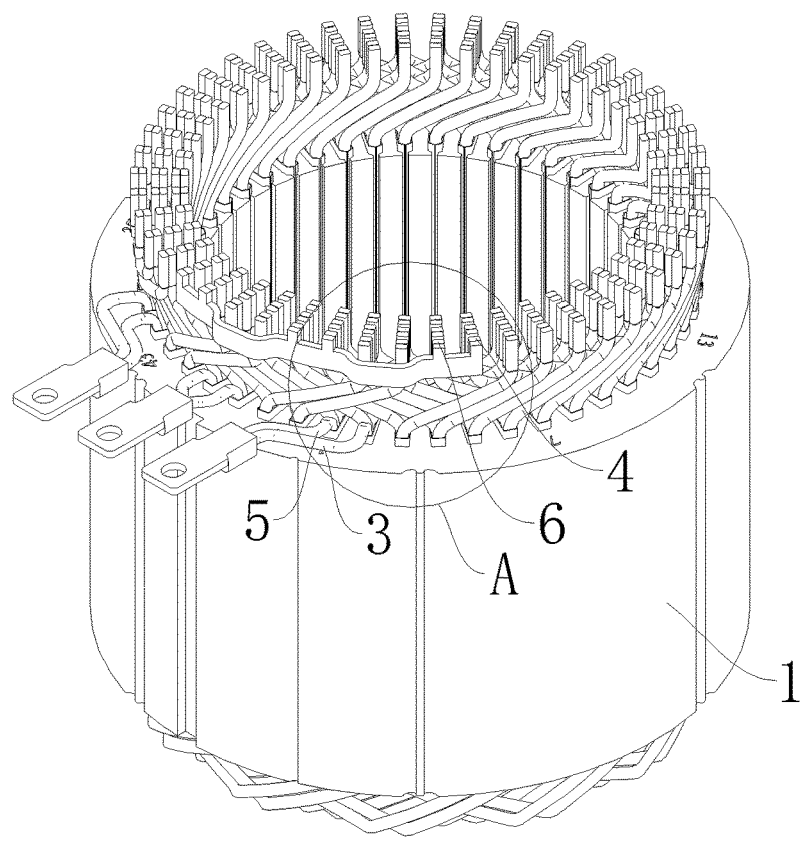
FIG. 8 is a schematic diagram of a stator module according to an embodiment of this application.
Figure 9:
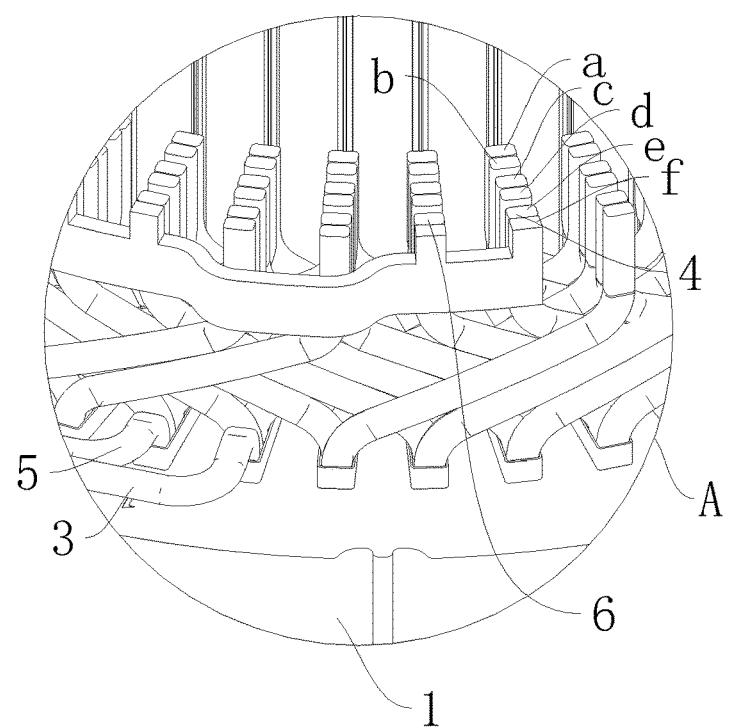
FIG. 9 is an enlarged diagram of a part A in FIG. 8.

As shown in FIG. 5 to FIG. 7, a second winding coil 22 of each phase of the stator winding 2 may include a third winding part 221 and a fourth winding part 222 connected end to end, the third winding part 221 constructs a start segment of the second winding coil 22, and the fourth winding part 222 constructs an end segment of the second winding coil 22.

In the third winding part 221, a $r^{th}$ layer of an $(n-47)^{th}$ slot is a start point of the third winding part 221, and a $r^{th}$ layer of an $(n-23)^{th}$ slot is an end point of the third winding part 221. The third winding part 221 may include a thirteenth crossing segment 2211 to an eighteenth crossing segment 2216. It should be noted that, the third winding part 221 may include the thirteenth crossing segment 2211, the fourteenth crossing segment 2212, the fifteenth crossing segment 2213, the sixteenth crossing segment 2214, the seventeenth crossing segment 2215, and the eighteenth crossing segment 2216.

The $r^{th}$ layer of the $(n-47)^{th}$ slot to an $r^{th}$ layer of an $(n-6)^{th}$ slot construct the thirteenth crossing segment 2211; the $r^{th}$ layer of the $(n-6)^{th}$ slot to an $a^{th}$ layer of the $(n-6)^{th}$ slot construct the fourteenth crossing segment 2212, and in the fourteenth crossing segment 2212, the winding moves back and forth between the $(n-6)^{th}$ slot and an $n^{th}$ slot and is wound from the outer side of the radial direction to the inner side of the radial direction of the stator core 1; the $a^{th}$ layer of the $(n-6)^{th}$ slot to an $r^{th}$ layer of an $(n-12)^{th}$ slot construct the fifteenth crossing segment 2213, and in the fifteenth crossing segment 2213, the winding moves back and forth between the $(n-6)^{th}$ slot and the $(n-12)^{th}$ slot and is wound from the inner side of the radial direction to the outer side of the radial direction of the stator core 1; the $r^{th}$ layer of the $(n-12)^{th}$ slot to an $r^{th}$ layer of an $(n-17)^{th}$ slot construct the sixteenth crossing segment 2214; the $r^{th}$ layer of the $(n-17)^{th}$ slot to an $a^{th}$ layer of the $(n-17)^{th}$ slot construct the seventeenth crossing segment 2215, and in the seventeenth crossing segment 2215, the winding moves back and forth between the $(n-17)^{th}$ slot and an $(n-11)^{th}$ slot and is wound from the outer side of the radial direction to the inner side of the radial direction of the stator core 1; and the $a^{th}$ layer of the $(n-17)^{th}$ slot to the $r^{th}$ layer of the $(n-23)^{th}$ slot construct the eighteenth crossing segment 2216, and in the eighteenth crossing segment 2216, the winding moves back and forth between the $(n-17)^{th}$ slot and the $(n-23)^{th}$ slot and is wound from the inner side of the radial direction to the outer side of the radial direction of the stator core 1.

In the fourth winding part 222, the $r^{th}$ layer of the $(n-23)^{th}$ slot is a start point of the fourth winding part 222, and a $r^{th}$ layer of an $(n-41)^{th}$ slot is an end point of the fourth winding part 222. The fourth winding part 222 may include a nineteenth crossing segment 2221 to a twenty-fourth crossing segment 2226. It should be noted that, the fourth winding part 222 may include the nineteenth crossing segment 2221, the twentieth crossing segment 2222, the twenty-first crossing segment 2223, the twenty-second crossing segment 2224, the twenty-third crossing segment 2225, and the twenty-fourth crossing segment 2226.

The $r^{th}$ layer of the $(n-23)^{th}$ slot to an $r^{th}$ layer of an $(n-30)^{th}$ slot construct the nineteenth crossing segment 2221; the $r^{th}$ layer of the $(n-30)^{th}$ slot to an $a^{th}$ layer of the $(n-30)^{th}$ slot construct the twentieth crossing segment 2222, and in the twentieth crossing segment 2222, the winding moves back and forth between the $(n-30)^{th}$ slot and an $(n-24)^{th}$ slot and is wound from the outer side of the radial direction to the inner side of the radial direction of the stator core 1; the $a^{th}$ layer of the $(n-30)^{th}$ slot to an $r^{th}$ layer of an $(n-36)^{th}$ slot construct the twenty-first crossing segment 2223, and in the twenty-first crossing segment 2223, the winding moves back and forth between the $(n-30)^{th}$ slot and the $(n-36)^{th}$ slot and is wound from the inner side of the radial direction to the outer side of the radial direction of the stator core 1; the $r^{th}$ layer of the $(n-36)^{th}$ slot to an $r^{th}$ layer of the $(n-41)^{th}$ slot construct the twenty-second crossing segment 2224; the $r^{th}$ layer of the $(n-41)^{th}$ slot to an $a^{th}$ layer of the $(n-41)^{th}$ slot construct the twenty-third crossing segment 2225, and in the twenty-third crossing segment 2225, the winding moves back and forth between the $(n-41)^{th}$ slot and an $(n-35)^{th}$ slot and is wound from the outer side of the radial direction to the inner side of the radial direction of the stator core 1; and the $a^{th}$ layer of the $(n-41)^{th}$ slot to the secondary outer layer of the $(n-41)^{th}$ slot construct the twenty-fourth crossing segment 2226, and in the twenty-fourth crossing segment 2226, the winding moves back and forth between the $(n-41)^{th}$ slot and the $(n-47)^{th}$ slot and is wound from the inner side of the radial direction to the outer side of the radial direction of the stator core 1.

The $n^{th}$ slot is a start slot, and an outermost layer of the start slot is connected to a second lead line 5; and for an end slot, five stator slots 11 exist between the end slot and the start slot, and a secondary outer layer of the end slot is connected to a second star point line 6. It should be noted that, as shown in FIG. 5, the $1^{st}$ slot may be the start slot, an $f^{th}$ layer of the start slot is connected to the second lead line 5, and the $43^{th}$ slot may be the end slot, and an eth layer of the end slot is connected to the second star point line 6.

FIG. 5 shows a winding manner of the second winding coil 22 of each phase of the stator winding 2. 2f has the second lead line 5, 8e has the second star point line 6, a winding star point of the second winding coil 22 of each phase of the stator winding 2 is 2f, and a specific winding mode of the second winding coil 22 of each phase of the stator winding 2 is as follows:

2f→43f→1e→43d→1c→43b→1a→43a→37b→
43c→37d→43e→37f→32f→38e→32d→38c→
32b→38a→32a→26b→32c→26d→32e→26f→
19f→25e→19d→25c→19b→25a→19a→13b→
19c→13d→19e→13f→8f→14e2→8d→14c→
8b→14a→8a→2b→8c→2d→8e.

Through winding in this winding mode, a winding structure of the second winding coil 22 of each phase of the stator winding 2 may be optimized. Through this winding mode, the second lead line 5 and the second star point line 6 may be both disposed at the welding end 232, so that the height of the welding end 232 may be fully utilized.

In addition, it is easy to adjust the number of coils of the stator winding 2, and two winding coils may be changed into one winding coil by twisting and welding heads of the first star point line 4 of the first winding coil 21 of each phase of the stator winding 2 and the second lead line 5 of the second winding coil 22 of each phase of the stator winding 2. When the number of coils is adjusted, it is not easy to generate unbalanced currents, thereby preventing a loop current phenomenon, and further preventing a failure of the motor.

In addition, in a winding process, potential equalization between sub-coils 1s finally achieved by setting different pitches between a plurality of crossing segments to balance a potential vector of the stator slot 11 and suppress angular phase differences between potentials of slot torque angles, so that the loop current inside the stator winding 2 may be suppressed, and an effect of low temperature rise is achieved. Moreover, harmonic electromagnetic excitation generated by the loop current may also be suppressed while the loop current is suppressed, thereby greatly suppressing vibration and noise of the motor during operation.

Therefore, through the cooperation between the stator core 1 and the stator winding 2, the first lead line 3 and the first star point line 4 may be both disposed at the welding end 232, so that the height of the welding end 232 may be fully utilized. In addition, the loop current phenomenon may be prevented, so as to prevent the failure of the motor.

In some embodiments, as shown in FIG. 2 and FIG. 5, n=i. It should be noted that, the $i^{th}$ slot in FIG. 2 may be the $1^{st}$ slot, and the $n^{th}$ slot in FIG. 5 may also be the $1^{st}$ slot. In this way, the first winding coil 21 of each phase and the second winding coil 22 of each phase may be set more properly, so that the winding structure of the stator winding 2 may be optimized, and working performance of the stator winding 2 may be improved.

In some embodiments, as shown in FIG. 10 to FIG. 14, the stator winding 2 may include a plurality of conductor segments, and each of the conductor segments may include a bent portion 231 and a first in-slot portion 233 and a second in-slot portion 234 that are connected to the bent portion 231. First in-slot portions 233 and second in-slot portions 234 that are of the plurality of conductor segments and that are located in adjacent layers are welded on the welding end 232. The first in-slot portion 233 passes through one of the slot layers 12 in one of the stator slots 11, the second in-slot portion 234 passes through one of slot layers 12 in another stator slot 11, and end portions of the first in-slot portion 233 and the second in-slot portion 234 protrude out of the stator core 1 after passing through the stator slot 11.

An end portion of the first in-slot portion 233 away from the bent portion 231 is located outside the stator slot 11, and this part of structure may construct a welding end 232. Correspondingly, an end portion of the second in-slot portion 234 away from the bent portion 231 is located outside the stator slot 11, and this part of structure may construct another welding end 232.

Any cross section of the conductor segment perpendicular to an extending direction of the conductor segment is non-circular. In an embodiment, cross sections are all rectangular. Optionally, any cross section of a U-shaped conductor segment is in a shape of a rectangle. A short side of the rectangle is perpendicular to a bottom wall of the stator slot 11. Further, in an extending direction of U-shaped conductor segments, areas of cross sections of the U-shaped conductor segments are equal. After the plurality of conductor segments are all inserted into the stator slots 11 of the stator core 1, an anti-interference effect between adjacent conductor segments is better.

Figure 15:
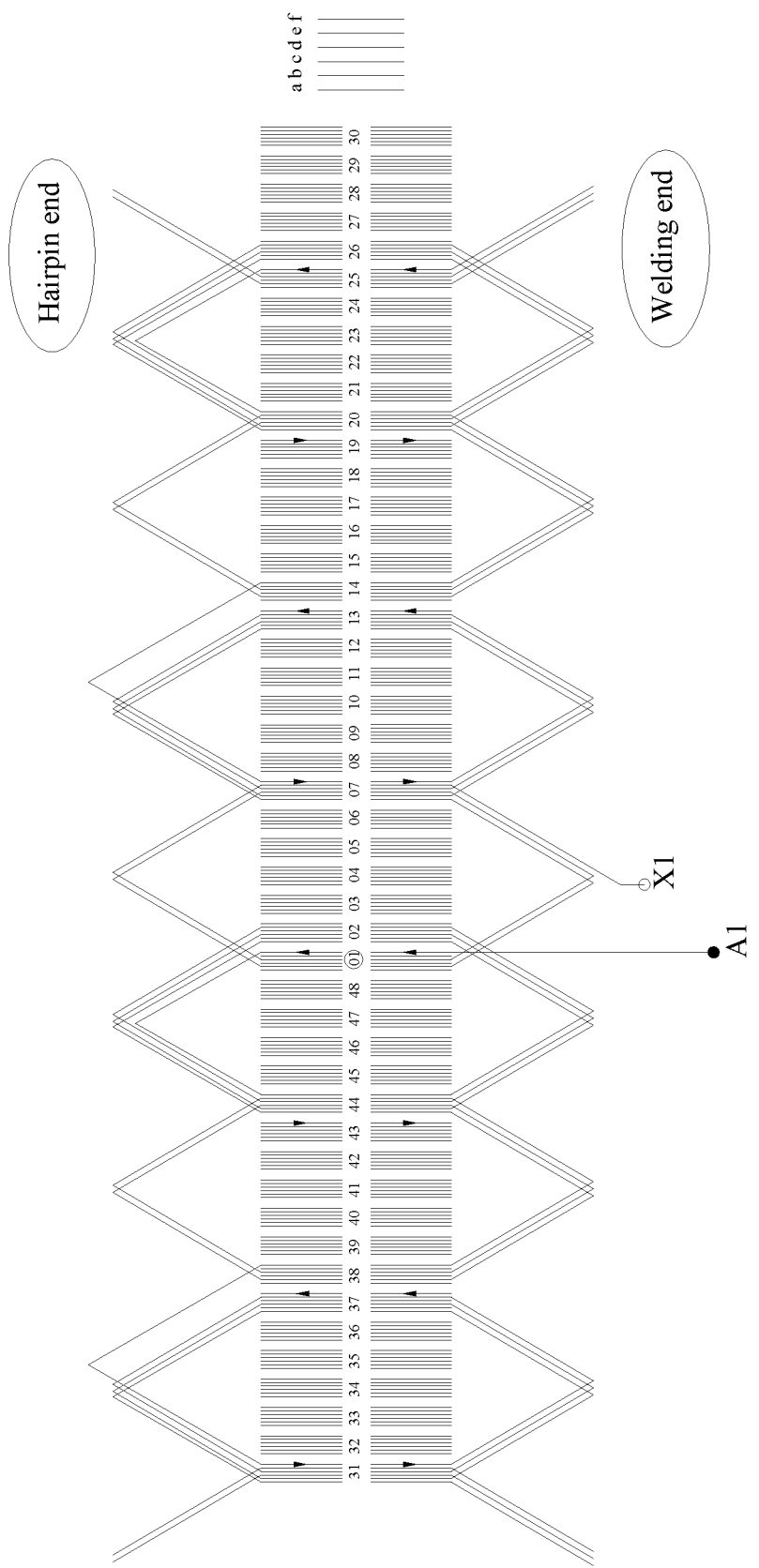
FIG. 15 is a wiring diagram of a first winding coil according to an embodiment of this application.
Figure 16:
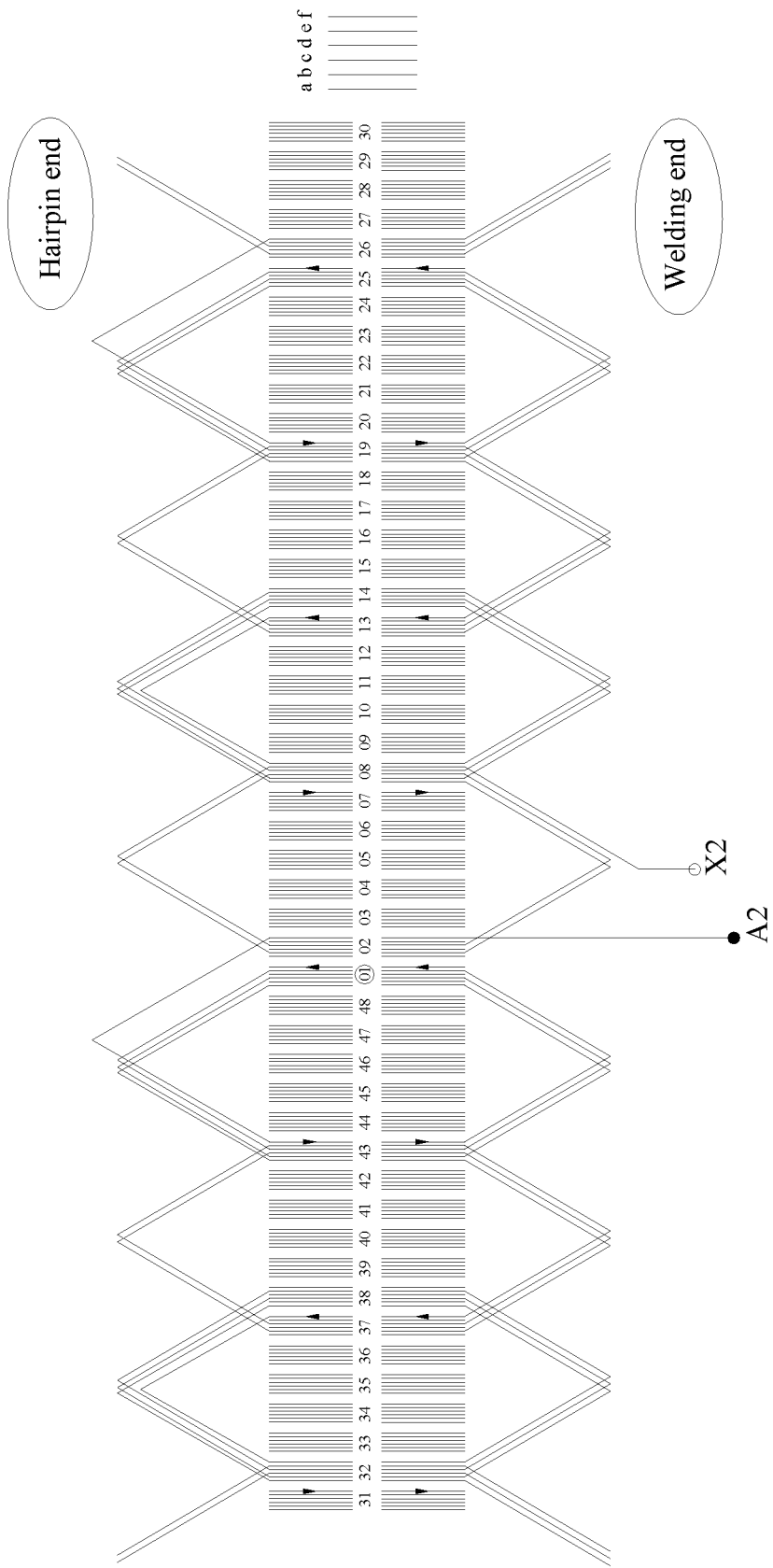
FIG. 16 is a wiring diagram of a second winding coil according to an embodiment of this application.
Figure 17:
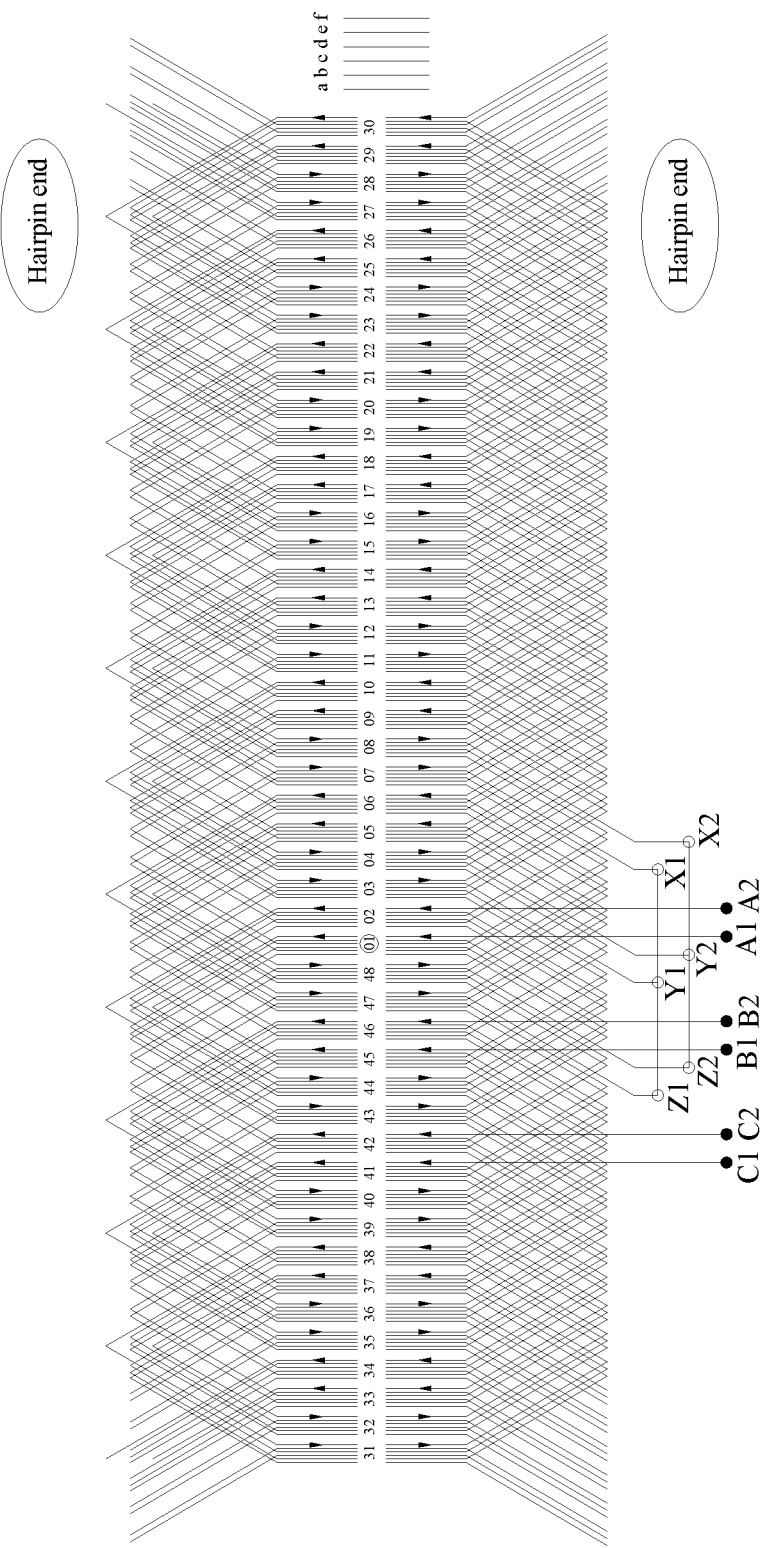
FIG. 17 is a three-phase two-coil wiring diagram according to an embodiment of this application.

As shown in FIG. 15 to FIG. 17, an end where the bent portion in the conductor segment is located may be defined as a hairpin end of the stator winding 2, and an end where the end portions of the first in-slot portion 233 and the second in-slot portion 234 are located is referred to as a welding end 232 of the stator winding 2. The welding end 232 is formed by sequentially welding the first in-slot portions 233 of the plurality of U-shaped conductor segments and the second in-slot portions 234 of the conductor segments adjacent to the first in-slot portions 233.

In some embodiments, as shown in FIG. 10 to FIG. 14, the conductor segments may include a first-class conductor segment 23, a second-class conductor segment 24, and a third-class conductor segment 25. A pitch between a first in-slot portion 233 and a second in-slot portion 234 of the first-class conductor segment 23 is (y−1) stator slots 11, a pitch between a first in-slot portion 233 and a second in-slot portion 234 of the second-class conductor segment 24 is y stator slots 11, and a pitch between a first in-slot portion 233 and a second in-slot portion 234 of the third-class conductor segment 25 is (y+1) stator slots 11, where y is an integer and y=z/2p.

In some embodiments, the first-class conductor segment 23 is located at the first crossing segment 2111, the seventh crossing segment 2121, the sixteenth crossing segment 2214, and the twenty-second crossing segment 2224, the first in-slot portion 233 of the first-class conductor segment 23 is located at an outermost layer of a stator slot 11, and the second in-slot portion 234 of the first-class conductor segment 23 is located at an outermost layer of another stator slot 11. According to the winding mode of this application, the number of required types of the first-class conductor segment 23 is a relatively small, the first-class conductor segment 23 has a simple forming process, requires only a few production facilities, and may be produced in batch. In addition, the quantity of welding spots of the welding end 232 may be reduced by using the first-class conductor segment 23, so that manufacturing costs may be reduced.

In some embodiments, the second-class conductor segment 24 is located at the second crossing segment 2112, the third crossing segment 2113, the fifth crossing segment 2115, the sixth crossing segment 2116, the eighth crossing segment 2122, the ninth crossing segment 2123, the eleventh crossing segment 2125, the twelfth crossing segment 2126, the fourteenth crossing segment 2212, the fifteenth crossing segment 2213, the seventeenth crossing segment 2215, the eighteenth crossing segment 2216, the twentieth crossing segment 2222, the twenty-first crossing segment 2223, the twenty-third crossing segment 2225, and the twenty-fourth crossing segment 2226.

The second-class conductor segment 24 may include an intra-layer conductor segment (second crossing segment 2112) and an inter-layer conductor segment. (the third crossing segment 2113, the fifth crossing segment 2115, the sixth crossing segment 2116, the eighth crossing segment 2122, the ninth crossing segment 2123, the eleventh crossing segment 2125, the twelfth crossing segment 2126, the fourteenth crossing segment 2212, the fifteenth crossing segment 2213, the seventeenth crossing segment 2215, the eighteenth crossing segment 2216, the twentieth crossing segment 2222, the twenty-first crossing segment 2223, the twenty-third crossing segment 2225, and the twenty-fourth crossing segment 2226). A first in-slot portion 233 of the intra-layer conductor segment is located at an outermost layer of a stator slot 11, and a second in-slot portion 234 is located at an outermost layer of another stator slot 11, or a first in-slot portion 233 of the intra-layer conductor segment is located at an innermost layer of a stator slot 11, and a second in-slot portion 234 is located at an innermost layer of another stator slot 11; and a first in-slot portion 233 of the inter-layer conductor segment is located at a middle slot layer 12 of a stator slot 11, and a second in-slot portion 234 is located at a middle slot layer 12 of another stator slot 11, which are located at different layers. The first-class conductor segment 23 and the third-class conductor segment 25 are located in a first side slot layer 35, a second-class conductor segment 24 is located in a second side slot layer 36 and in the middle slot layer 12, the middle slot layer 12 is a slot layer located between the first side slot layer 35 and the second side slot layer 36.

In some embodiments, the third-class conductor segment 25 is located at the fourth crossing segment 2114, the tenth crossing segment 2124, the thirteenth crossing segment 2211, and the nineteenth crossing segment 2221, the first in-slot portion 233 of the third-class conductor segment 25 is located at an outermost layer of a stator slot 11, and the second in-slot portion 234 of the third-class conductor segment 25 is located at an outermost layer of another stator slot 11.

A motor according to an embodiment of this application includes the stator module 10 in the foregoing embodiment. The stator module 10 is disposed on the motor. The first lead line 3 and the first star point line 4 may be both disposed at the welding end 232 by using the stator module 10, so that the height of the welding end 232 may be fully utilized. In addition, the loop current phenomenon may be prevented, so as to prevent the failure of the motor, and ensure working reliability of the motor.

According to a specific embodiment of the embodiments of this application, the stator module 10 is applicable to a motor having z slots, 2p poles, and m phases, the number of slots per pole and phase is q=z/m/(2p), the number of parallel branches is a, a≤q, and the stator module 10 includes a stator core 1 and a stator winding 2. The stator core 1 has 48 stator slots 11, the plurality of stator slots 11 are distributed in a circumferential direction of the stator core 1, and in the circumferential direction of the stator core 1, the plurality of stator slots 11 are a $1^{st}$ slot, a $2^{nd}$ slot, . . . , and a $48^{th}$ slot respectively, each of the plurality of stator slots has 6 slot layers, and the 6 slot layers are an $a^{th}$ layer, a $b^{th}$ layer, . . . , and an $f^{th}$ layer respectively in a direction from an inner side to an outer side in a radial direction of the stator core 1.

A first winding coil 21 of each phase of the stator winding 2 includes a first winding part 211 and a second winding part 212 connected end to end, the first winding part 211 constructs a start segment of the first winding coil 21, and the second winding part 212 constructs an end segment of the first winding coil 21.

In the first winding part 211, an $f^{th}$ layer of a $1^{st}$ slot is a start point of the first winding part 211, an $f^{th}$ layer of a $25^{th}$ slot is an end point of the first winding part 211, and the first winding part 211 includes a first crossing segment 2111 to a sixth crossing segment 2116. The $f^{th}$ layer of the $1^{st}$ slot to an $f^{th}$ layer of a $44^{th}$ slot construct the first crossing segment 2111; the $f^{th}$ layer of the $44^{th}$ slot to an $a^{th}$ layer of the $44^{th}$ slot construct the second crossing segment 2112, and in the second crossing segment 2112, the winding moves back and forth between the $44^{th}$ slot and a $2^{nd}$ slot and is wound from the outer side of the radial direction to the inner side of the radial direction of the stator core 1; the $a^{th}$ layer of the $44^{th}$ slot to an $f^{th}$ layer of a $38^{th}$ slot construct the third crossing segment 2113, and in the third crossing segment 2113, the winding moves back and forth between the $44^{th}$ slot and the $38^{th}$ slot and is wound from the inner side of the radial direction to the outer side of the radial direction of the stator core 1; the $f^{th}$ layer of the $38^{th}$ slot to an $f^{th}$ layer of a $31^{st}$ slot construct the fourth crossing segment 2114; the $f^{th}$ layer of the $31^{st}$ slot to an $a^{th}$ layer of the $31^{st}$ slot construct the fifth crossing segment 2115, and in the fifth crossing segment 2115, the winding moves back and forth between the $31^{st}$ slot and a $37^{th}$ slot and is wound from the outer side of the radial direction to the inner side of the radial direction of the stator core 1; and the $a^{th}$ layer of the $31^{st}$ slot to the $f^{th}$ layer of the $25^{th}$ slot construct the sixth crossing segment 2116, and in the sixth crossing segment 2116, the winding moves back and forth between the $31^{st}$ slot and the $25^{th}$ slot and is wound from the inner side of the radial direction to the outer side of the radial direction of the stator core 1.

In the second winding part 212, the $f^{th}$ layer of the $25^{th}$ slot is a start point of the second winding part 212, a secondary outer layer of a $7^{th}$ slot is an end point of the second winding part 212, and the second winding part 212 includes a seventh crossing segment 2121 to a twelfth crossing segment 2126. The $f^{th}$ layer of the $25^{th}$ slot to an $f^{th}$ layer of a $20^{th}$ slot construct the seventh crossing segment 2121; the $f^{th}$ layer of the $20^{th}$ slot to an $a^{th}$ layer of the $20^{th}$ slot construct the eighth crossing segment 2122, and in the eighth crossing segment 2122, the winding moves back and forth between the $20^{th}$ slot and a $26^{th}$ slot and is wound from the outer side of the radial direction to the inner side of the radial direction of the stator core 1; the $a^{th}$ layer of the $20^{th}$ slot to an $f^{th}$ layer of a $14^{th}$ slot construct the ninth crossing segment 2123, and in the ninth crossing segment 2123, the winding moves back and forth between the $20^{th}$ slot and the $14^{th}$ slot and is wound from the inner side of the radial direction to the outer side of the radial direction of the stator core 1; the $f^{th}$ layer of the $14^{th}$ slot to an $f^{th}$ layer of the $7^{th}$ slot construct the tenth crossing segment 2124; the $f^{th}$ layer of the $7^{th}$ slot to an $a^{th}$ layer of the $7^{th}$ slot construct the eleventh crossing segment 2125, and in the eleventh crossing segment 2125, the winding moves back and forth between the $7^{th}$ slot and a $13^{th}$ slot and is wound from the outer side of the radial direction to the inner side of the radial direction of the stator core 1; and the $a^{th}$ layer of the $7^{th}$ slot to the secondary outer layer of the $7^{th}$ slot construct the twelfth crossing segment 2126, and in the twelfth crossing segment 2126, the winding moves back and forth between the $7^{th}$ slot and the $1^{st}$ slot and is wound from the inner side of the radial direction to the outer side of the radial direction of the stator core 1.

The $1^{st}$ slot is a start slot, and an outermost layer of the start slot is connected to a first lead line 3; and for an end slot, five stator slots 11 exist between the end slot and the start slot, and a secondary outer layer of the end slot is connected to a first star point line 4.

A second winding coil 22 of each phase of the stator winding 2 includes a third winding part 221 and a fourth winding part 222 connected end to end, the third winding part constructs a start segment of the second winding coil 22, and the fourth winding part constructs an end segment of the second winding coil 22.

In the third winding part 221, an $f^{th}$ layer of a $2^{nd}$ slot is a start point of the third winding part 221, an $f^{th}$ layer of a $26^{th}$ slot is an end point of the third winding part 221, and the third winding part 221 includes a thirteenth crossing segment 2211 to an eighteenth crossing segment 2216. The $f^{th}$ layer of the $2^{nd}$ slot to an $f^{th}$ layer of a $43^{rd}$ slot construct the thirteenth crossing segment 2211; the $f^{th}$ layer of the $43^{rd}$ slot to an $a^{th}$ layer of the $43^{rd}$ slot construct the fourteenth crossing segment 2212, and in the fourteenth crossing segment 2212, the winding moves back and forth between the $43^{rd}$ slot and the $1^{st}$ slot and is wound from the outer side of the radial direction to the inner side of the radial direction of the stator core 1; the $a^{th}$ layer of the $43^{rd}$ slot to an $f^{th}$ layer of a $37^{th}$ slot construct the fifteenth crossing segment 2213, and in the fifteenth crossing segment 2213, the winding moves back and forth between the 43$^{rd}$ slot and the 37$^{th}$ slot and is wound from the inner side of the radial direction to the outer side of the radial direction of the stator core 1; the f$^{th}$ layer of the 37$^{th}$ slot to an f$^{th}$ layer of a 32$^{nd}$ slot construct the sixteenth crossing segment 2214; the f$^{th}$ layer of the 32$^{nd}$ slot to an a$^{th}$ layer of the 32$^{nd}$ slot construct the seventeenth crossing segment 2215, and in the seventeenth crossing segment 2215, the winding moves back and forth between the 32$^{nd}$ slot and a 38$^{th}$ slot and is wound from the outer side of the radial direction to the inner side of the radial direction of the stator core 1; and the a$^{th}$ layer of the 32$^{nd}$ slot to the f$^{th}$ layer of the 26$^{th}$ slot construct the eighteenth crossing segment 2216, and in the eighteenth crossing segment 2216, the winding moves back and forth between the 32$^{nd}$ slot and the 26$^{th}$ slot and is wound from the inner side of the radial direction to the outer side of the radial direction of the stator core 1.

In the fourth winding part 222, the f$^{th}$ layer of the 26$^{th}$ slot is a start point of the fourth winding part 222, a secondary outer layer of an 8$^{th}$ slot is an end point of the fourth winding part 222, and the fourth winding part 222 includes a nineteenth crossing segment 2221 to a twenty-fourth crossing segment 2226. The f$^{th}$ layer of the 26$^{th}$ slot to an f$^{th}$ layer of a 19$^{th}$ slot construct the nineteenth crossing segment 2221; the f$^{th}$ layer of the 19$^{th}$ slot to an a$^{th}$ layer of the 19$^{th}$ slot construct the twentieth crossing segment 2222, and in the twentieth crossing segment 2222, the winding moves back and forth between the 19$^{th}$ slot and the 25$^{th}$ slot and is wound from the outer side of the radial direction to the inner side of the radial direction of the stator core 1; the a$^{th}$ layer of the 19$^{th}$ slot to an f$^{th}$ layer of the 13$^{th}$ slot construct the twenty-first crossing segment 2223, and in the twenty-first crossing segment 2223, the winding moves back and forth between the 19$^{th}$ slot and the 13$^{th}$ slot and is wound from the inner side of the radial direction to the outer side of the radial direction of the stator core 1; the f$^{th}$ layer of the 13$^{th}$ slot to an f$^{th}$ layer of the 3$^{th}$ slot construct the twenty-second crossing segment 2224; the f$^{th}$ layer of the 13$^{th}$ slot to an a$^{th}$ layer of the 8$^{th}$ slot construct the twenty-third crossing segment 2225, and in the twenty-third crossing segment 2225, the winding moves back and forth between the 8$^{th}$ slot and the 14$^{th}$ slot and is wound from the outer side of the radial direction to the inner side of the radial direction of the stator core 1; and the a$^{th}$ layer of the 8$^{th}$ slot to the secondary outer layer of the 8$^{th}$ slot construct the twenty-fourth crossing segment 2226, and in the twenty-fourth crossing segment 2226, the winding moves back and forth between the 8$^{th}$ slot and the 2$^{nd}$ slot and is wound from the inner side of the radial direction to the outer side of the radial direction of the stator core 1.

The 1$^{st}$ slot is a start slot, and an outermost layer of the start slot is connected to a second lead line 5; and for an end slot, five stator slots 11 exist between the end slot and the start slot, and a secondary outer layer of the end slot is connected to a second star point line 6.

Figure 10:
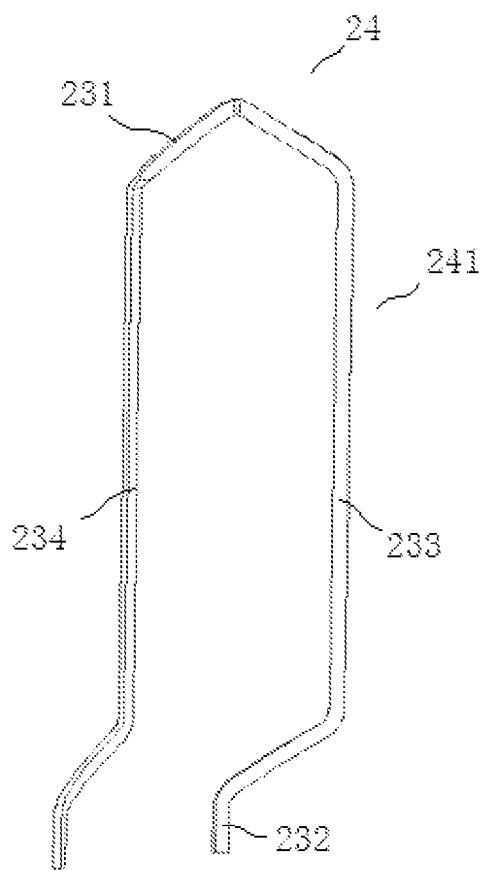
FIG. 10 is a schematic diagram of a first conductor segment in a second-class conductor segment according to an embodiment of this application.
Figure 11:
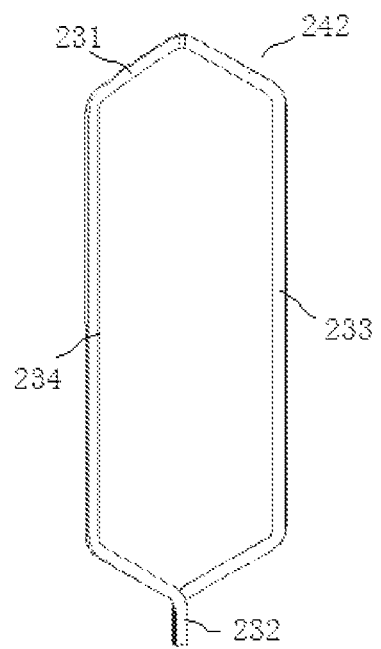
FIG. 11 is a schematic diagram of a second conductor segment in the second-class conductor segment according to an embodiment of this application.
Figure 12:
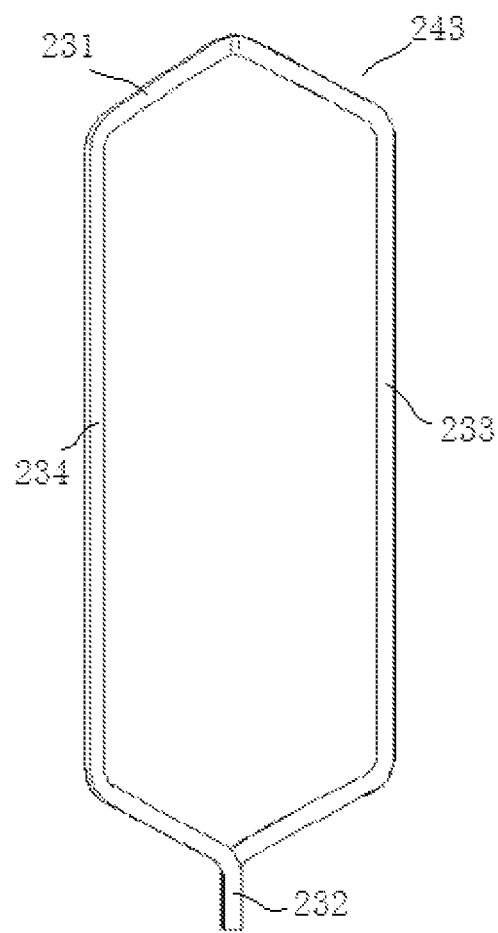
FIG. 12 is a schematic diagram of a third conductor segment in the second-class conductor segment according to an embodiment of this application.
Figure 13:
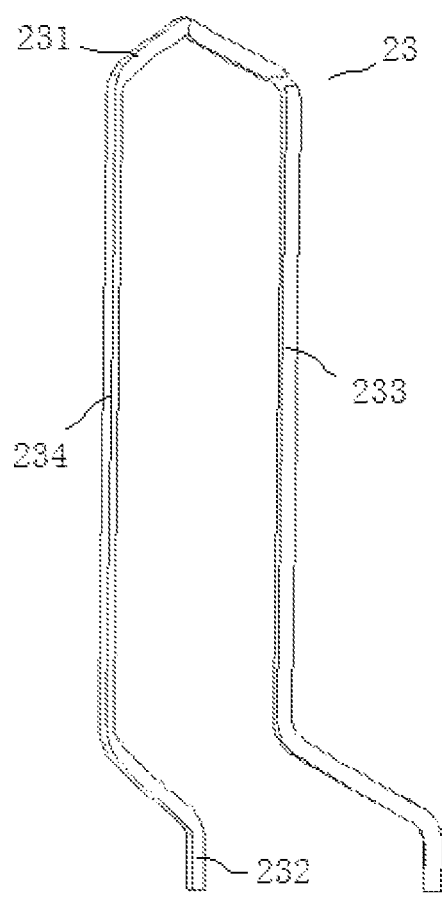
FIG. 13 is a schematic diagram of a first-class conductor segment according to an embodiment of this application.
Figure 14:
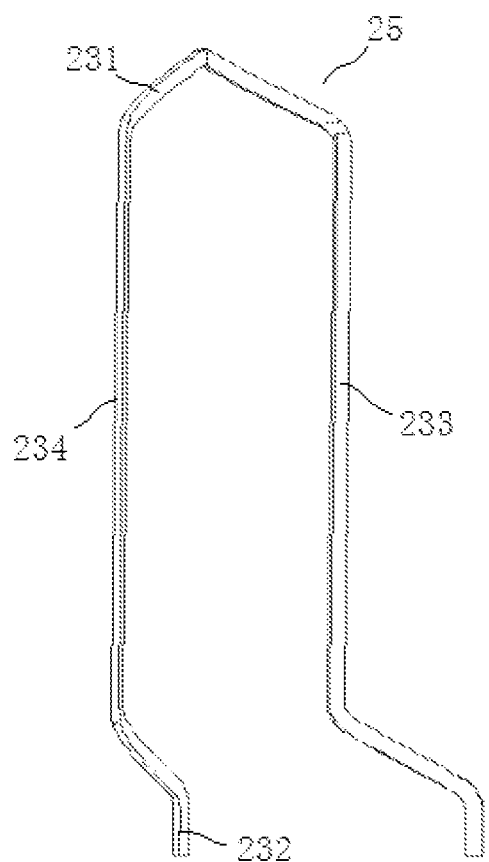
FIG. 14 is a schematic diagram of a third-class conductor segment according to an embodiment of this application.

In some embodiments, connection from one a$^{th}$ layer to another a$^{th}$ layer is implemented by using the first conductor segment 241 in the second-class conductor segment 24 shown in FIG. 10, connection from a b$^{th}$ layer to a c$^{th}$ layer is implemented by using the second conductor segment 242 in the second-class conductor segment 24 shown in FIG. 11, and connection from a d$^{th}$ layer to an eth layer is implemented by using the third conductor segment 243 in the second-class conductor segment 24 shown in FIG. 12. Hairpins are sheathed on the inside and the outside from one f$^{th}$ layer to another f$^{th}$ layer, which are connected by using the first-class conductor segment 23 shown in FIG. 13 in a case of a span length 5, and connected by using the third-class conductor segment 25 shown in FIG. 14 in a case of a span length 7. Welding from the a$^{th}$ layer to the b$^{th}$ layer, the c$^{th}$ layer to the d$^{th}$ layer, and the eth layer to the f$^{th}$ layer is implemented by using non-closed ends of the hairpins.

As shown in FIG. 15 to FIG. 17, A1, B1, and CI are lead lines of the first winding coil 21, XI, YI, and ZI are star point lines of the first winding coil 21, A2, B2, and C2 are lead lines of the second winding coil 22, X2, Y2, and Z2 are star point lines of the second winding coil 22, and a to f may respectively represent a ist layer to a 6$^{th}$ layer in a same slot (the 1$^{st}$ layer is located close to an opening of the slot, and the 6$^{th}$ layer is located at a bottom of the slot).

In descriptions of this specification, descriptions of reference terms such as "one embodiment", "some embodiments", "example", "specific example" or "some examples" mean including specific features, structures, materials, or characteristics described in the embodiment or example in at least one embodiment or example of this application. In this specification, exemplary descriptions of the foregoing terms do not necessarily refer to a same embodiment or example. In addition, the described specific features, structures, materials, or characteristics may be combined in an appropriate manner in any one or more embodiments or examples. In addition, with no conflict, a person skilled in the art can integrate and combine different embodiments or examples and features of the different embodiments and examples described in this specification.

Although the embodiments of this application are shown and described above, it may be understood that the foregoing embodiments are exemplary, and cannot be understood as limitations to this application. A person of ordinary skill in the art may make changes, modifications, replacements, and variations to the foregoing embodiments without departing from the scope of this application.

The invention claimed is:

1. A stator module, applicable to a motor, wherein:
the motor comprises z slots, 2p poles, and m phases, wherein z, p, and m are integers; and
the stator module comprises a stator core and a stator winding, the stator core has a plurality of stator slots, the stator slots are distributed in a circumferential direction of the stator core, the stator winding includes a first-class conductor segment, a second-class conductor segment, and a third-class conductor segment, a pitch between a first in-slot portion and a second in-slot portion of the first-class conductor segment is (y−1) stator slots, a pitch between a first in-slot portion and a second in-slot portion of the second-class conductor segment is y stator slots, and a pitch between a first in-slot portion and a second in-slot portion of the third-class conductor segment is (y+1) stator slots, wherein y is an integer and y=z/2p.

2. The stator module according to claim 1, wherein the first-class conductor segment and the third-class conductor segment are located in a first side slot layer, the second-class conductor segment is located in a second side slot layer and in a middle slot layer, the middle slot layer is located between the first side slot layer and the second side slot layer.

3. The stator module according to claim 2, wherein the second-class conductor segment comprises an intra-layer conductor segment and an inter-layer conductor segment, a first in-slot portion and a second in-slot portion of the inter-layer conductor segment are located between two adjacent middle slot layers.

4. The stator module according to claim 3, wherein the first in-slot portion and the second in-slot portion of the third-class conductor segment are located in the first side slot layer, an end of a third-class conductor segment and an end of an inter-layer conductor segment are connected and crossing toward a same direction.

5. The stator module according to claim 1, wherein two welding ends of at least one second-class conductor segment are disposed close to each other and coincide in a radial direction of the stator core.

6. The stator module according to claim 1, wherein two welding ends of the first-class conductor segment tilt in a first direction, two welding ends of the intra-layer conductor segment tilt in a second direction, and the first direction and the second direction are opposite to each other.

7. The stator module according to claim 1, wherein each of the conductor segments includes a bent portion, and a first in-slot portion and a second in-slot portion of the conductor segment are connected to the bent portion in a first end of an axial direction of the stator module, and each of the conductor segments extends out of the stator core and forms a welding end in a second end of the axial direction, wherein the first end of the axial direction is close to the bent portion and the second end of the axial direction is away from the bent portion.

8. The stator module according to claim 7, wherein the stator winding includes a star point line which is located on the welding end.

9. A motor, comprising a stator module, wherein:
the motor comprises z slots, 2p poles, and m phases, wherein z, p, and m are integers; and
the stator module comprises a stator core and a stator winding, the stator core has a plurality of stator slots, the stator slots are distributed in a circumferential direction of the stator core, the stator winding includes a first-class conductor segment, a second-class conductor segment, and a third-class conductor segment, a pitch between a first in-slot portion and a second in-slot portion of the first-class conductor segment is (y−1) stator slots, a pitch between a first in-slot portion and a second in-slot portion of the second-class conductor segment is y stator slots, and a pitch between a first in-slot portion and a second in-slot portion of the third-class conductor segment is (y+1) stator slots, wherein y is an integer and y=z/2p.

10. The motor according to claim 9, wherein the first-class conductor segment and the third-class conductor segment are located in a first side slot layer, the second-class conductor segment is located in a second side slot layer and in a middle slot layer, the middle slot layer is located between the first side slot layer and the second side slot layer.

11. The motor according to claim 10, wherein the second-class conductor segment comprises an intra-layer conductor segment and an inter-layer conductor segment, a first in-slot portion and a second in-slot portion of the inter-layer conductor segment are located between two adjacent middle slot layers.

12. The motor according to claim 11, wherein the first in-slot portion and the second in-slot portion of the third-class conductor segment are located in the first side slot layer, an end of a third-class conductor segment and an end of an inter-layer conductor segment are connected and crossing toward a same direction.

13. The motor according to claim 10, wherein two welding ends of the first-class conductor segment tilt in a first direction, two welding ends of the intra-layer conductor segment tilt in a second direction, and the first direction and the second direction are opposite to each other.

14. The motor according to claim 9, wherein two welding ends of at least one second-class conductor segment are disposed close to each other and coincide in a radial direction of the stator core.

15. The motor according to claim 9, wherein each of the conductor segments includes a bent portion, and a first in-slot portion and a second in-slot portion of the conductor segment are connected to the bent portion in a first end of an axial direction of the stator module, and each of the conductor segments extends out of the stator core and forms a welding end in a second end of the axial direction, wherein the first end of the axial direction is close to the bent portion and the second end of the axial direction is away from the bent portion.

16. The motor according to claim 15, wherein the stator winding includes a star point line which is located on the welding end.

* * * * *